United States Patent
Man et al.

(10) Patent No.: US 7,114,585 B2
(45) Date of Patent: Oct. 3, 2006

(54) POWER TRAIN FOR USE IN MOTOR VEHICLES AND THE LIKE

(75) Inventors: Laszlo Man, Ottersweier (DE); Wolfgang Reik, Sonnhalde (DE); Bruno Muller, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/801,384

(22) Filed: Mar. 15, 2004

(65) Prior Publication Data

US 2004/0173393 A1    Sep. 9, 2004

Related U.S. Application Data

(63) Continuation of application No. 10/021,310, filed on Oct. 22, 2001, now abandoned, which is a continuation of application No. 09/564,361, filed on Jun. 22, 2001, now abandoned, which is a continuation of application No. PCT/DE99/02833, filed on Sep. 2, 1999.

(30) Foreign Application Priority Data

| Sep. 9, 1998 | (DE) | ................................. 198 41 140 |
| Mar. 25, 1999 | (DE) | ................................. 199 13 493 |
| Apr. 1, 1999 | (DE) | ................................. 199 15 166 |
| Apr. 15, 1999 | (DE) | ................................. 199 16 936 |

(51) Int. Cl.
    *B60K 6/02* (2006.01)
(52) U.S. Cl. ..................... 180/65.2; 903/910
(58) Field of Classification Search ............. 180/65.2, 180/65.3, 65.4, 65.6; 477/2, 3, 5, 6; 475/1, 475/5, 8; 903/910
See application file for complete search history.

(56) References Cited

U.S. PATENT DOCUMENTS

| 2,559,740 | A | | 7/1951 | Sinclair |
| 2,564,393 | A | * | 8/1951 | Clancy ......................... 477/5 |
| 2,571,172 | A | * | 10/1951 | Robin et al. .................. 475/5 |
| 3,142,202 | A | * | 7/1964 | Muhlbeyer .................... 477/5 |
| 3,295,395 | A | * | 1/1967 | Willard ......................... 475/5 |
| 3,585,878 | A | * | 6/1971 | Heckenbach, Jr. ............ 475/5 |
| 3,768,715 | A | * | 10/1973 | Tout ............................ 226/40 |
| 4,335,429 | A | | 6/1982 | Kawakatsu |
| 4,458,156 | A | | 7/1984 | Maucher |
| 4,869,332 | A | | 9/1989 | Fujita |
| 5,337,848 | A | | 8/1994 | Bader |
| 5,529,159 | A | | 6/1996 | Troccaz |
| 5,539,286 | A | * | 7/1996 | Brinkmeyer et al. ........ 318/139 |
| 5,655,990 | A | * | 8/1997 | Ooyama et al. ........... 180/65.8 |
| 5,735,770 | A | | 4/1998 | Omote |
| 5,895,333 | A | * | 4/1999 | Morisawa et al. ............. 475/5 |
| 5,935,040 | A | | 8/1999 | Tabata |
| 6,142,907 | A | | 11/2000 | Minowa |
| 6,155,366 | A | | 12/2000 | Lin |

FOREIGN PATENT DOCUMENTS

DE    32 37 675 A1  *  4/1983

* cited by examiner

*Primary Examiner*—Frank Vanaman
(74) *Attorney, Agent, or Firm*—Darby & Darby

(57) ABSTRACT

A power train for a motor vehicle includes a combustion engine, a clutch or other torque-coupling device, a transmission, and an electro-mechanical energy converter that is operable at least as a motor and as a generator. The electro-mechanical energy converter is coupled to the output shaft of the combustion engine through a torque transfer device with at least two rpm ratios that automatically set themselves according to whether the vehicle is operating in a start-up mode or in a driving mode.

25 Claims, 17 Drawing Sheets

POWER TRAIN FOR USE IN MOTOR VEHICLES AND THE LIKE

CROSS-REFERENCE TO RELATED APPLICATION

This is a division of application Ser. No. 10/021,310, filed Oct. 22, 2001 now abandoned, which is a continuation of now abandoned application Ser. No. 09/564,361, filed Jun. 22, 2001, which is a continuation of International Application No. PCT/DE 99/02833 filed in the German language on Sep. 2, 1999. The aforementioned prior US applications are hereby incorporated herein by reference in their entirety.

BACKGROUND OF THE INVENTION

The invention relates to a motor vehicle power train including a drive source such as a combustion engine with a driving shaft, a driven unit with a driven shaft such as a transmission with a transmission input shaft, as well as at least one electromechanical energy converter interacting with the power train, and at least one clutch that is arranged in the torque flow path between the driving shaft and the driven shaft and serves to couple and uncouple the torque flow between the drive source and the driven unit.

Arrangements of this kind are known from the German laid-open application DE-OS 32 30 121 as hybrid drives with an electric motor and a combustion engine, or from the German patent DE-PS 41 12 215 as combustion engines with a starter-generator.

Depending on the specific layout, the electro-mechanical energy converter may be arranged either coaxially surrounding the rotational axis of the combustion engine—as known for example from the German laid-open application DE-OS 33 35 923—, or aligned along a separate axis of rotation parallel to the rotational axis of the combustion engine, as known from the French laid-open application FR-OS 81 19324.

When using the electromechanical energy converter to start the combustion engine, in order to make better use of the limited amount of available torque, the interactive connection to the power train, e.g., a belt-, friction-, or gear drive, is usually run at a transfer ratio where the electro-mechanical energy converter turns faster than the drive source, the latter being for example a combustion engine. As soon as the combustion engine is running and the electro-mechanical energy converter is operated in the generator mode, it is advantageous to operate the electro-mechanical energy converter at a transfer ratio that is optimized for the generator mode in order to increase the degree of efficiency, which requires the use of a ratio-changing rotary transfer mechanism.

A proposed arrangement according to the German patent DE-PS 41 12 215 includes a planetary gear mechanism in which the change of transfer ratios is controlled from the outside by way of a clutch that is actuated by an additionally required actuator motor. The additional transducer- and control means required with this solution lead to an increase in weight as well as cost.

OBJECT OF THE INVENTION

The present invention therefore has the objective of improving a power train of the kind described above by providing an interactive connection between the electro-mechanical energy converter and the combustion engine with a means of changing the transfer ratio that is more cost-effective and easier to handle, ensures a longer operating life of the interactive connection, and can easily be installed on the housing of the combustion engine, if possible without requiring a modification of the engine housing.

SUMMARY OF THE INVENTION

The present invention solves the task just stated by proposing a motor vehicle power train that includes a drive source such as a combustion engine with a driving shaft as well as at least one electro-mechanical energy converter that is interactively connected with the driving shaft and works at least as a motor and as a generator. The interactive connection between the electro-mechanical energy converter and the driving shaft has at least two transfer ratios that set themselves automatically according to which operating mode the electro-mechanical energy converter is working in. The selection of operating modes includes at least a start-up mode and a driving mode.

The electro-mechanical energy converter according to the inventive concept can be designed as a synchronous, asynchronous, reluctance-based, or other type of machine, and it can be arranged advantageously on a shaft other than the driving shaft. In particular, the electro-mechanical energy converter can be arranged on a shaft that runs parallel to the output shaft of the drive source, which can be a combustion engine, turbine, or the like. It may be advantageous to arrange the interactive connection between the electro-mechanical energy converter and the driving shaft at a location between the combustion engine and the driven unit, or at the opposite end of the driving shaft which normally drives auxiliary devices. It may also be advantageous to use a single belt to drive several auxiliary devices including the electro-mechanical energy converter.

The interactive connection can be formed by a pair of pulleys that are coupled to each other through the frictional contact with an endless-loop element. The pulleys can be belt-transmission pulleys of the known kind and the endless-loop element can be a belt. As a particularly advantageous alternative, especially for transmitting a torque of large magnitude, one could use pairs of conical discs, where the endless-loop device takes the form of a chain providing the frictional torque transfer between the cone pulleys. The interactive connection could further be designed as at least one pair of meshing gears or friction wheels. It is advantageous to provide for each transfer ratio a separate pair of gears or a separate pair of pulleys with its own endless-loop element.

In an appropriate application of a power train according to the invention, the electro-mechanical energy converter is used at least as a starter motor, but it could also be advantageously employed for other uses. In this case, the electro-mechanical energy converter can be designed with an appropriate performance characteristic, so that it can be used not only as a generator and starter motor, but can also deliver torque to the driven unit, possibly to the extent of propelling the vehicle with the electro-mechanical energy converter alone.

The driven unit may be, e.g., a speed-changing transmission that can be uncoupled from the combustion engine by means of at least one clutch. It is advantageous if the electro-mechanical energy converter can be interactively connected to the combustion engine while being uncoupled from the driven unit, with the possibility that the electro-mechanical energy converter can also be connected to the speed-changing transmission while the combustion engine may be uncoupled from the electro-mechanical energy converter and the transmission. Arrangements of this kind suggest themselves particularly if, to optimize the degree of efficiency, the electro-mechanical energy converter and/or its rotary transfer device are to be spatially and/or functionally accommodated inside the transmission converter. In this case, the engine is started preferably with the speed-changing transmission in a neutral condition. The electro-mechanical energy converter may be arranged so that it coaxially surrounds the transmission input shaft, or it may be arranged on a separate shaft of its own that is interactively connected to the transmission input shaft. Further references made herein to an interactive connection between the combustion engine and the electro-mechanical energy converter will implicitly include the interactive connection between the driven unit and the electro-mechanical energy converter through the transmission input shaft.

It may further be advantageous if the electro-mechanical energy converter is arranged between two shiftable clutches, so that the electro-mechanical energy converter can be uncoupled from the engine as well as from the driven unit, in order to make use of the inertial momentum of the freely rotating electro-mechanical energy converter for generating electrical energy and/or to build up a rotary momentum for starting the engine, in which case the electro-mechanical energy converter can be coupled to an inertial mass that is arranged on the driving shaft, e.g., a flywheel.

It is advantageous according to the inventive concept, if the interactive connection between the driving shaft and the electro-mechanical energy converter includes a rotary transfer device that allows the working rpm-rates of the electro-mechanical energy converter to be better adapted to the degree of efficiency that is achievable in the different operating modes, and if the switch-over from one transfer ratio of the rotary transfer device to another is controlled automatically by the rotary transfer device itself. An arrangement with many different transfer ratios may be advantageous, but there may also be a particular advantage in a simplified embodiment with only two transfer ratios because of the lower complexity. If the electro-mechanical energy converter is used as a starter/generator, a first operating mode or starting mode is to crank up the combustion engine, and a second operating mode or driving mode is to generate electrical energy. Accordingly, a first transfer ratio is provided for the starting mode, and a second transfer ratio is provided for the driving mode. In the first transfer ratio, the rpm-rate of the electro-mechanical energy converter is stepped down to a lower rpm-rate of the engine shaft, resulting in an increased torque for starting the engine. The second transfer ratio, used in the driving mode, is designed so that the rpm-ratio between the electro-mechanical energy converter and the driving shaft is between 1:2 and 2:1. It is advantageous to design the interactive connection so that there is no change in rpm-rate in the driving mode. The first transfer ratio is selected with special preference in a range between 3:2 and 7:1. It may in some cases be advantageous to provide a transmission stage with a constant ratio of, e.g., between 3:2 and 5:1 by which the engine-rpm rate is smaller in relation to the rpm-rate of the electro-mechanical energy converter. This constant-ratio stage may be superimposed on the two transfer ratios.

The different transfer ratios can advantageously be provided by torque-transfer devices of all kinds, including standing transmissions and orbiting transmissions. The interactive connection can be constituted by belt drives, gear pairs, friction-wheel pairs, chain drives and the like. In the case of a standing transmission, the interactive connection is preferably made up of at least one gear pair.

The setting and changing of the transfer ratio is controlled through a combination of clutches and freewheeling devices. The latter will also be referred to herein as freewheeling clutches, freewheeling clutch bearings, or overrunning clutches. The clutches and freewheeling devices serve to either open or lock certain gear combinations or torque-flow paths in the rotary transfer device. The clutches which, depending on their arrangement, become engaged or disengaged as the rpm rate increases, are not actuated externally, but can be coupled and uncoupled by centrifugal forces. Another advantageous embodiment uses an electromagnetic clutch that is controlled by rpm-dependent electrical signals from the starter/generator. Thus, it is possible to switch between two different transfer ratios, e.g., with a combination of two overrunning clutches, or with one clutch and one overrunning clutch, or with two clutches.

In particular, a rotary transfer device can adapt its transmission ratio depending on the direction in which the torque acts on the transfer device, i.e., depending on whether the torque comes from the electro-mechanical energy converter (starter mode) or from the combustion engine (driving mode). This can be achieved through a design where, e.g., the overrunning clutch for the second transfer ratio is overrun in the starter mode, while another overrunning clutch is overrun in the driving mode.

An advantageous rotary transfer device according to the inventive concept may consist, e.g., of a planetary gear mechanism with a sun gear, at least one planet gear and a ring gear, where the latter may be fixedly connected to the housing, while the planet carrier is connected to the electro-mechanical energy converter. One overrunning device or a clutch is interposed in the connection between the planet carrier and the electro-mechanical energy converter, while a second overrunning device or a second clutch is interposed between the planet gears and the combustion engine.

In another inventive design version of the planet gear set, the ring gear is axially movable between a first position where the ring gear is locked to the housing and a second position where the ring gear is locked to the planet carrier. The sun gear is rigidly connected to the electro-mechanical energy converter, and the planet carrier is rigidly connected to the combustion engine. The first transfer ratio is realized by coupling the ring gear to the housing and thereby immobilizing it, so that the torque flows from the electro-mechanical energy converter through the rigidly connected sun gear to the planet gears which, in turn, move the planet-gear carrier and thereby crank up the engine with a torque-augmenting transfer ratio. The second transfer ratio is realized by locking the ring gear to the planet-gear carrier and thus directly to the combustion engine, so that the second transfer ratio is 1:1. The axial movement of the ring-gear can be controlled in particular by using helical gears in the planetary gear mechanisms. With a torque flow directed from the electro-mechanical energy converter to the combustion engine, the action of the torque will push the axially movable ring gear towards the housing so as to engage the housing through friction-locking or form-locking contact. If the torque flow is directed in the opposite way, i.e., from the combustion engine to the electro-mechanical energy converter, the interaction of the helical tooth profiles will push the ring gear the opposite way and into friction- or form-locking contact with a surface portion of the planet-gear carrier. The friction- or form-locking contact can be realized by providing the contact surfaces of the planet-gear carrier and housing with engagement means that are complementary to corresponding engagement means on the respective surfaces of the ring gear. The engagement means may be constituted for example by tooth profiles (e.g., a so-called Hirth tooth profile), prongs or claws of a dog clutch, or other projections. Means such as friction surfaces with corresponding friction linings may be used either by themselves or in a supporting function, where the friction surfaces may be arranged either on the ring gear or on the planet gear carrier and the housing.

If the electro-mechanical energy converter is used in a booster mode, i.e., to assist the combustion engine in propelling the vehicle, it is advantageous to keep the rotary transfer device locked in the first transfer ratio, particularly at rpm rates that are higher than those occurring in the starter mode. This may be accomplished by at least one centrifugal body that is arranged in a recess on the outer circumference of the planet-gear carrier and engages a corresponding recess on the inside circumference of the ring gear, thereby making a form-locking connection that keeps the transfer ratio locked, although a reversal of the torque flow occurs when the booster mode is initiated. It is advantageous to provide a larger number of centrifugal bodies distributed over the circumference. The centrifugal bodies can be spherical, for example, or they can be rounded pins, in which case the edges of the recesses in the ring gear may be rounded in axial and radial directions. It is also advantageous if the centrifugal force on the bodies or spheres is counteracted by a spring force that is appropriately dimensioned to work as required.

In the same manner, a rotary transfer device can be designed with one gear pair per transfer ratio, with the gear pairs being engaged by freewheeling devices and clutches. For example, with two transfer ratios, there is one clutch or overrunning clutch to be provided for each ratio.

Further according to the inventive concept, an embodiment may be advantageous that has two pulley pairs with different pulley diameters for two different transfer ratios. Each of the pulley pairs may have its own, separate belt. One pulley of each pair is mounted on the driving shaft while the other is mounted on the shaft of the electro-mechanical energy converter. Each of the pulley pairs has one overrunning clutch, with the two clutches engaging in opposite rotary directions.

In a coaxially arranged electro-mechanical energy converter, the rotary transfer device can be arranged inside the rotor in order to save space, where the fixed ring gear can be formed by the stator. Furthermore, if the electro-mechanical energy converter has a shaft running parallel to the driving shaft, with an interactive connection through two disc-shaped transfer elements such as belt pulleys, friction wheels, or gears, it is advantageous if the rotary transfer device is arranged radially inside one of the disc-shaped elements, either in the element associated with the combustion engine or the element associated with the electro-mechanical energy converter, because this allows the electro-mechanical energy converter to be designed with a small diameter. If the rotary transfer device is arranged inside the belt pulley that belongs to the electro-mechanical energy converter, the housing of the latter can at the same time serve as the ring gear for the rotary transfer device, and the disc-shaped transfer elements can provide the separate fixed transfer ratio.

In a further development of the inventive concept, a rotary damper device and/or a rotary shock absorber is arranged between the electro-mechanical energy converter and the combustion engine. The rotary damper device and/or shock absorber can be arranged between the combustion engine and the electro-mechanical energy converter or, in a particularly advantageous way, between the rotary transfer device and the combustion engine. The rotary damper device and/or a rotary shock absorber used here are components that are known per se and are inventively configured for use in the power train of the present invention. For example, if the rotary transfer device is arranged on the axis of the electro-mechanical energy converter, the damper and/or shock absorber can be accommodated radially inside the rotor. If the rotary transfer device is arranged either at the combustion engine or at the electro-mechanical energy converter, the rotary damper and/or shock absorber can be accommodated radially inside the components that provide the interactive connection, for example inside the belt pulleys or gears.

According to the inventive concept, the rotary transfer devices can be attached by means of their housings to the electro-mechanical energy converter or the combustion engine. It can further be of particular advantage, for a concept that does not require fastening means on the combustion engine or the electro-mechanical energy converter, if the housing is arranged to be rotatable on its mounting axis, e.g., the axis of the driving shaft or of the shaft of the electro-mechanical energy converter. Following is a description of an example where the housing is mounted on the driving shaft. The description also implicitly applies to the case where the housing is mounted on the shaft of the electro-mechanical energy converter, an alternative arrangement which can be advantageous in certain applications, dependent in particular on the shape of the installation space.

This kind of rotary transfer device is statically indeterminate. According to the inventive concept, the housing of a rotary transfer device that is rotatably supported on the driving shaft can have an arm with a belt-tightener element extending towards the endless-loop device. The housing will thus brace itself against the endless-loop device through the tightener element with a force that depends on the magnitude of the torque transmitted by the endless-loop device, so that the latter will have a torque-dependent amount of tension, advantageously including a base amount of tension. As a particularly advantageous arrangement, the housing and/or belt pulley is supported by ball bearings or the like at the same axial position as the endless-loop device, i.e., in the same plane as the latter, because this arrangement is free of bending forces on the bearings, so that the useful life of the bearings is increased. To optimize the cost economy of the rotary transfer device—also in other embodiments—, a simple bearing design, e.g. gliding bearings using sleeves of a polymer material or the like, can be used for the transfer ratio of the starter mode, because the starter mode is employed for comparatively short time periods in comparison to the generator mode. Thus, the starter-mode related elements are less prone to wear.

In a further possible design for a statically indeterminate arrangement of the housing, the shaft of the belt-pulley is separate from the driving shaft, with a force-locking connection between the shafts, e.g., through a gear pair. The housing can be rotatably mounted on the driving shaft and also rotatably connected to the shaft of the belt-pulley. When a torque is acting on the rotary transfer device, the belt pulley shaft yields to the torque by moving about the center of rotation of the driving shaft, but is constrained by the tension of the endless-loop device. The distance d that can be selected between the rotary axis of the belt pulley and the axis of the driving shaft needs to be large enough, including a safety factor, so that the shaft of the belt-pulley shaft cannot make a full turn, i.e., spin unconstrained about the driving shaft. The upper limit for the distance d is determined primarily by the design dimensions, so that an advantageous range for d is between 20 cm and 1 cm. Planetary gear mechanisms can advantageously be used in this embodiment—including designs with an axially movable ring gear as described above.

According to the inventive concept, it is also possible to design statically indeterminate arrangements for transfer devices using gear pairs, e.g., two gear pairs for two transfer ratios. For example, two gears with oppositely oriented overrunning clutches and their respective mating gears are rotationally constrained to the belt pulley, where the shaft of the belt pulley is again offset from the driving shaft. Here two, the belt pulley is constrained by the tension of the endless-loop device.

It can be advantageous, if essential components of the power train, e.g., the rotary transfer device and/or the gears, are made of metal and/or a polymer material, or of a combination of both. Furthermore, components such as housings, covers and/or flanges may be die-cut, stamped, and/or deep-drawn. It can furthermore be advantageous, depending on assembly requirements, to use screws, rivets, welds and/or keyed constraints as connecting means.

According to the invention, it can be particularly advantageous if the electro-mechanical energy converter is arranged so that it coaxially surrounds the driving shaft at what is usually the belt-drive side. The arrangement of the electro-mechanical converter on the side that faces away from the vehicle transmission offers some general advantages in comparison to an arrangement with two parallel shafts on the belt-drive side or coaxial arrangements where the electro-mechanical energy converter is axially interposed between the combustion engine and the vehicle transmission.

One of the advantages is that the rotor of the electro-mechanical energy converter, because of its moment of inertia, can serve as a flywheel, so that the flywheel on the transmission side of the engine can be omitted in the design, except for the friction surfaces of the clutch that is needed with a shift transmission. The arrangement may include a rotary shock absorber for the power train in the area of the electro-mechanical energy converter or on the transmission side of the driving shaft. A rotary damping device can advantageously be arranged in the torque flow path between the driving shaft and the rotor of the electro-mechanical energy converter, so that the latter is to a large extent isolated from torsional vibrations, or the torsional stresses on the driving shaft with rotary oscillations of the rotor mass can be reduced by uncoupling the rotor mass from the driving shaft. It may be particularly advantageous if the rotary vibration damper is designed to provide effective vibration isolation above a critical frequency. This is achieved by placing circumferentially acting energy-storing devices between the rotor mass and a mass that is connected directly to the driving shaft, e.g., a flywheel with an optimized amount of mass according to given design requirements. The rotor mass and the flywheel mass are rotatable in relation to each other, so that they work as a dual-mass flywheel with the aforementioned advantageous properties, whereby the resonance frequency of the power train can be moved to a range below the idling rpm range and thus outside of the driving rpm range of the vehicle. It can also be advantageous if the damper is operative only within a segment of the operating range of the power train, e.g., with a given transfer ratio between the driving shaft and the rotor and/or in a given operating mode, e.g., in the driving mode, while the damper action is inoperative in the starting mode.

It can further be advantageous to use a rotary shock absorber in parallel with the damper. Furthermore, in another embodiment, the rotor mass can be used as a shock absorber mass. The torsional rigidity and the amount of damping in the coupling between the rotor and the driving shaft can be tuned to the resonant frequency of the driving shaft.

It can furthermore be advantageous to use a rotary transfer device between the rotor and the driving shaft in a module combination with a rotary shock absorber and a torsional vibration damper. The combined module may be partially filled with oil or grease, so that the components are permanently lubricated. It may be advantageous to isolate the meshing gear profiles from the torsional vibrations in order to achieve a low noise level and to make the gears last for the life of the vehicle.

A rotary transfer device between the rotor and the driving shaft with at least two rpm-transfer ratios can be shifted, e.g., by the axial thrust between helical gears, by centrifugal clutches, overrunning clutches and the like. As a further alternative, the rotary transfer device can be designed to be shifted form the outside, e.g., by braking and or locking individual gears by means of magnetic clutches, magnetic brakes, magnetically switched dog clutches and/or actuator-operated friction clutches, so that different transfer ratios can be realized through different shift combinations of these devices.

The automatic, externally actuated shifts can be synchronized by appropriate means such as synchronizer rings and similar devices that allow gear shifts dependent on the difference in rpm rates, or the electro-mechanical energy converter can be actively controlled to reach the rpm rate required for synchronization. This can be accomplished, for example before a shift to a speed-amplifying ratio, i.e., changing from a high to a low rpm-rate of the electro-mechanical energy converter, if the amount of power supplied to the electro-mechanical energy converter is reduced to a level where the faster of the clutch components to be engaged will be slowed down during the synchronization process to approximately match the rpm-rate of the components that will establish the new torque transfer path after the shift. Analogously, before a shift to a speed-reducing ratio, the rpm-rate of the electro-mechanical energy converter can be increased by raising the power level for a short time interval, so that the difference in rpm-rates between the components engaged in the new torque transfer path is minimized. If during the synchronization process, the electro-mechanical energy converter is running too slowly, the anticipated drag torque is compensated. In the opposite case, where the electro-mechanical energy converter is running too fast, the slower of the mating components will during a short time interval be accelerated by the electro-mechanical energy converter.

The jump in power required for synchronizing the electro-mechanical energy converter can be in the range of one to several kilowatts, its magnitude being determined by the synchronization torque associated with the corresponding synchronization rpm rate. Given that the synchronization process by definition involves that the rpm-rates of the transfer components to be engaged are brought closer to each other, the power jump is greatest at the beginning of the synchronization interval. During a synchronization period, whose length is determined by the design of the coupler- and shifter elements, the amount of power to be injected is based on the mass moment of inertia of the parts to be accelerated and on the change of rpm rate, the latter being a function of the transfer ratio of the rotary transfer device.

The amount of power that the electro-mechanical energy converter can absorb or generate to assist in the synchronization process depends on the operating mode. For example, if the electro-mechanical energy converter is working at maximum output rate in the generator mode, the generator torque cannot be further increased, based on principle. It can be advantageous if the power usage is reduced, for example by switching off different power-consuming devices, or by switching off the power from the battery. Thus, the electro-mechanical energy converter is artificially enabled to immediately provide a large amount of torque during a synchronization phase, while the onboard power grid is held at a voltage level higher than the battery-charging voltage, so that other power-consuming devices can be kept fully operative. A "soft" synchronization can be achieved in particular if the electro-mechanical energy converter is controlled so that the rpm rate for synchronization between the components to be engaged in the torque flow path for the new transfer ratio is approached with as low a change gradient as possible.

This applies analogously to a change from a low rpm rate to a high rpm rate of the electro-mechanical energy converter, where the torque of the latter can be "artificially" increased by switching on additional energy-consuming devices in order to "throw off load" during the shifting process. This can be made even more effective if the electro-mechanical energy converter is put into a motor mode. A higher amount of energy absorption can also be achieved if the electro-mechanical energy converter is operated with a lesser degree of efficiency.

In order to make the shift processes as comfortable as possible for the driver even with rapid rpm-changes, it is further proposed to change the shift-rpm level during operation, i.e., while the electro-mechanical energy converter is in the driving mode. For example in combination with exhaust turbo-charged engines, the shift-rpm level can be set at an rpm rate where a significant charging pressure is built up by the kinetic energy of the exhaust gas, so that the increased acceleration at the end of the "turbo gap" is available for the shift process and the electrical losses during the synchronization can thereby be compensated.

It is particularly advantageous in a power train according to the inventive concept, if mechanical energy is fed into the propulsion system during deceleration phases of the vehicle, where the energy is stored mechanically, e.g., as kinetic energy of a flywheel, such as the rotor mass of the electro-mechanical energy converter, so that the stored energy is available for a subsequent acceleration or start-up phase of the combustion engine or for conversion and storage as electrical energy. For concepts of this kind, where the driving shaft of the drive source (combustion engine) turns also during energy-recovery phases, e.g., if the electro-mechanical energy converter cannot be uncoupled from the combustion engine by a clutch, it is proposed to reduce the drag torque of the combustion engine through the following advantageous measures, which can be used either individually or in combination while the power train is operating in a drag mode:

The energy losses from engine drag can be reduced by leaks and by changing the load on the engine by a forced opening of the valves during the drag-mode phase. This measure can be used with electro-mechanical, electro-magnetic, hydraulic and pneumatic valve-actuator systems. However, a mechanical yactuator element may likewise be used advantageously.

The losses in the intake may be reduced by opening the throttle valve, e.g., through an existing actuator in vehicles with a so-called "E-Gas" feature (known in the US as cruise control).

The energy losses due to friction in the auxiliary modules may be reduced, e.g., by using electrically powered instead of belt-powered oil- and water pumps.

The frictional energy losses in the valve system may be reduced by using a drive mechanism for the valves that is not directly coupled to the crank shaft and can be switched off during a drag phase.

As the energy lost in the drag mode increases strongly with the engine rpm rate, the energy loss may be reduced by a change of the transmission ratio. For example, the transmission ratio can be adjusted conveniently by way of a stepless transmission (including continuously variable transmissions and hybrid transmissions with power branching), a multi-step automatic transmission, or an automated manual transmission. To reduce the energy lost in the drag mode, the transmission ratio can be set dependent on the transfer ratio of the electro-mechanical energy converter and the optimum operating point (rpm rate) that is associated with the transfer ratio. The optimal transmission ratio can be determined by a control unit, where both the drag-loss reduction and the optimum operating point of the electro-mechanical energy converter can be taken into account.

The energy loss due to drag during phases when the torque flow is reversed can be reduced by switching off or reducing the power delivered to auxiliary devices and energy-consuming devices, except those that serve a safety function, or where the occupants would immediately notice a reduction in comfort, e.g., electrical heaters, air-conditioning compressors and the like. It can also be advantageous to network the energy-consuming devices through a common interface (e.g., through a CAN, i.e., a central area network), in order to switch specifically targeted energy consuming devices on or off. From an energy point of view, this allows the combustion engine to be operated at higher compression and with reduced fuel consumption, when the engine is in the driving mode.

If a power train has a starter/generator and a combustion engine, but the two cannot be uncoupled from each other by means of a clutch, for example to save cost, it may be advantageous to improve the energy recovery by reducing the drag torque on the combustion engine, or the energy loss due to the drag torque, through one or a combination of several of the following measures:

reducing the losses due to compression and expansion;

reducing the losses at the intake by minimizing the air-flow resistance of the control and throttle elements in the drag mode;

reducing the energy loss due to friction by using auxiliary devices, e.g., oil- and/or water pumps, that are independent of the combustion engine, and/or valve-actuating mechanisms which, at least in the drag mode, are not driven by the combustion engine;

switching off non-essential energy-consuming devices such as electric heaters, air conditioners and the like.

It may be advantageous to reduce the energy losses due to leaks and the alternation of the air flow by holding the valves open when the engine is in drag mode. This can be accomplished by means of an electro-mechanical, electromagnetic, hydraulic or pneumatic and, specifically, a mechanical valve actuator. Losses due to the throttling of the air flow can be minimized by holding the throttle valve open by means of an automatic throttle actuator as is used with the so-called "E-Gas" feature (better known as cruise control). The energy lost due to friction in electrically operated auxiliary devices can be reduced during drag-mode phases by controlling those devices based on characteristic parameter fields. The friction in the valve mechanism will be eliminated if the latter is turned off when the power train is operated in the drag mode.

As a rule, the energy loss due to drag increases with an increasing rpm rate of the combustion engine. It can therefore be advantageous if the rpm ratio of the vehicle transmission, e.g., a continuously variable transmission, an automated manual transmission, a multi-speed automatic transmission, or a power-branched hybrid transmission, is set automatically at a high-speed level (overdrive), where the ratio may be adjusted to the optimum operating point of the electro-mechanical energy converter, and both the transmission ratio and the operating point of the electro-mechanical energy converter can be set by a control that optimizes the operating economy of the power train.

The power delivery, up to a complete shut-off of the auxiliary devices and energy-consuming units that are not directly essential to driving safety or to the comfort of the occupants can be controlled advantageously by a central communication system such as a CAN-bus, whereby the energy-consuming units can be controlled, i.e., switched on and off, according to predetermined priorities, so that the combustion engine can be operated during normal driving phases at a higher compression and with reduced fuel consumption.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

In the following detailed description, the invention is explained on the basis of embodiments illustrated in the attached drawings, wherein.

DESCRIPTION OF PREFERRED EMBODIMENTS

Figure 1A:
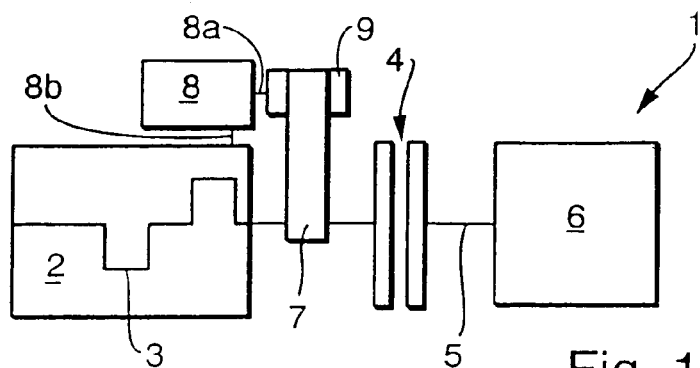
FIGS. 1a–d represent different possible arrangements of a power train according to the invention.

FIGS. 1a–d illustrate different possible arrangements of a power train 1, 1', 1'', 1''' according to the invention with a drive source 2, 2', 2'', 2''', e.g., a combustion engine, with a driving shaft or output shaft 3, 3', 3'', 3''' that can be coupled by means of a clutch 4, 4', 4'', 4''' to the input shaft 5, 5', 5'', 5''' of a driven unit 6, 6', 6'', 6''', e.g., a transmission such as a speed-changing transmission, an automatic transmission with multiple steps, or a continuously variable transmission (CVT). An electro-mechanical energy converter 8, 8', 8'', 8''' is connected to the output shaft 3, 3', 3'' in FIGS. 1a–c, and to the input shaft 5''' in FIGS. 1d through an interactive transfer connection 7, 7', 7'', 7''' that transfers torque and shifts the torque-transfer ratio automatically dependent on the torque-flow direction by means of a rotary transfer device 9, 9', 9'', 9'''.

In the embodiment of FIG. 1a, the interactive connection 7 between the clutch 4 and the combustion engine 2 is arranged to concentrically surround the output shaft 3 and to transmit torque from the combustion engine 2 by way of the rotary transfer device 9 to the electro-mechanical energy converter 8, and vice versa in the case where the torque originates from the electro-mechanical energy converter 8. In an embodiment not illustrated in a drawing, the rotary transfer device 9 is arranged on the output shaft 3, and the interactive connection 7 is coupled through a form-locking connection 7 directly to the shaft 8a of the electro-mechanical energy converter 8. The latter is connected directly to the combustion engine 2 by means of the fastening arrangement 8b, or to another stationary component of the vehicle (not shown) in which the power train is installed. The interactive connection 7 can be configured as a belt drive with a belt and pulleys, as a drive with conical discs and an endless-loop means such as a chain, or as a friction or gear device or the like. The rotary transfer device can be attached to the electro-mechanical energy converter 8 or the housing of the combustion engine 2 or any other fixed component of the vehicle, or it can be mounted in a statically indeterminate way where the housing of the rotary transfer device or a lever constituted by an offset between the output shaft and the transfer-device shaft is bearing against the interactive connection 7.

Figure 1B:
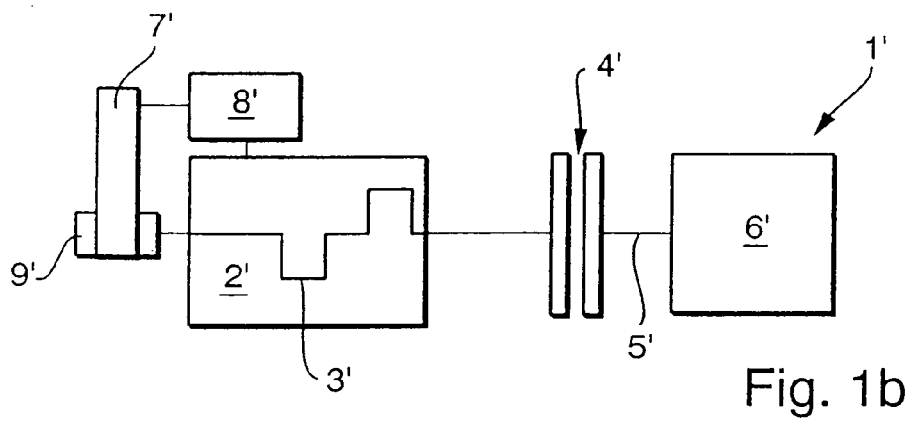

FIG. 1b illustrates a power train 1' that is identical to the power train 1 except for the following differences: The electro-mechanical energy converter 7' in the embodiment of FIG. 1b is arranged at the opposite side of the combustion engine 2', i.e., at the end of the output shaft 3' that faces away from the driven unit 6', by means of an interactive connection 7'. The self-shifting rotary transfer device 9' is arranged on the output shaft 3', but could also concentrically surrounding the shaft of the electro-mechanical energy converter 8' (in an embodiment that is not illustrated in the drawings).

Figure 1C:
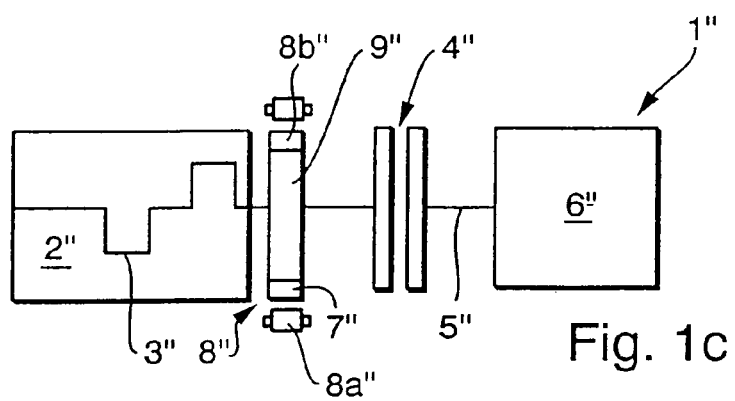

In the embodiment shown in FIG. 1c, the electro-mechanical energy converter 8" concentrically surrounds the output shaft 3" in the torque-flow path between the clutch 4" and the combustion engine 2", with the stator 8a" being attached to the housing of the combustion engine and the rotor 8b" being part of the rotary transfer device 9". The latter is arranged radially inside the rotor 8b", and the interactive connection 7" to the output shaft 3" is constituted, e.g., by friction wheels or gears.

As is self-evident, an electro-mechanical energy converter 8" that coaxially surrounds an output shaft 3" can also be arranged at the opposite end of the output shaft, i.e., on the side that faces away from the driven unit 6", with a rotary transfer device 9" between the electro-mechanical energy converter 8" and the combustion engine 2" arranged radially inside the rotor 8b". The latter arrangement has already been disclosed in the U.S. Pat. No. 4,458,156, whose full content is incorporated herein by reference. The advantage is that no major modifications have to be made at the interface between the combustion engine 2" and the driven unit 6", e.g., on the housing of the transmission.

Figure 1D:
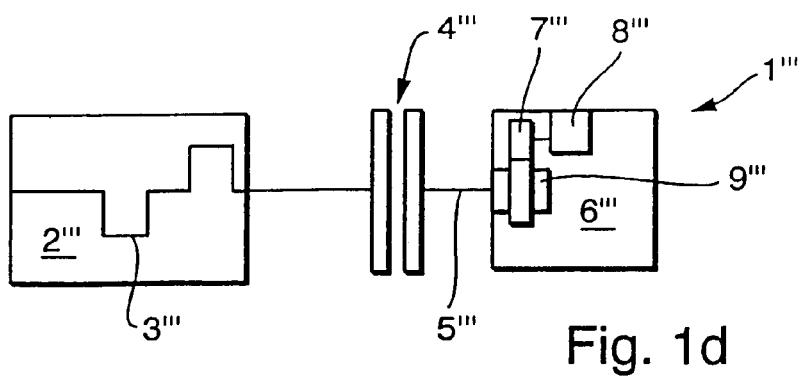

FIG. 1d illustrates an embodiment whose self-shifting rotary transfer device 9'" is integrated in the driven unit 6'", e.g., in a speed-changing transmission. In this case, too, as in the examples of FIGS. 1a and 1b, the rotary transfer device 9'" can be arranged to surround the transmission input shaft 5'" or the shaft of the electro-mechanical energy converter 8'". A recommended configuration of the interactive connection 7'", in addition to the examples described above, consists in this case preferably of a gear pair, which can also perform additional transfer-ratio functions in the transfer device.

In an advantageous arrangement of this kind, the electro-mechanical energy converter can be coupled to the transmission input shaft either directly or through a rotation-locked interactive connection. It can be particularly advantageous if the electro-mechanical energy converter can be uncoupled from the combustion engine by means of a clutch, and also if a further clutch is provided between the rotary transfer device and the driven unit, where the clutches can be friction clutches or form-locking clutches, depending on the design of the rotary transfer device.

Figure 2:
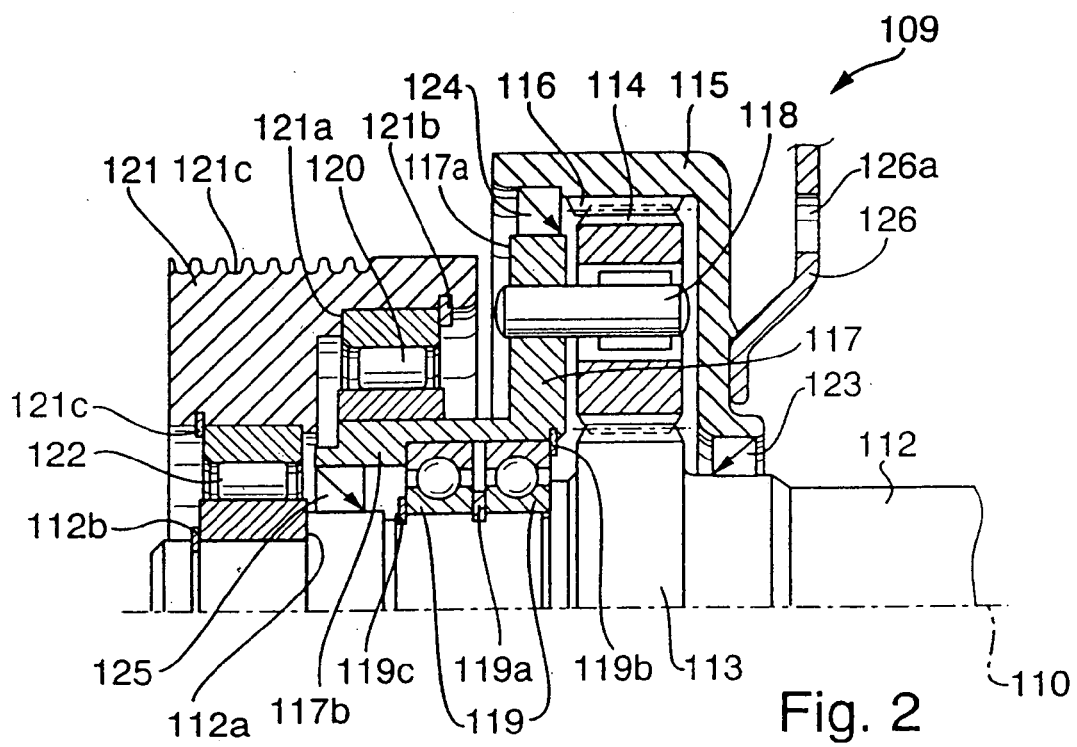
FIG. 2 represents a portion of a rotary transfer device according to the invention arranged on the shaft of the electro-mechanical energy converter, with two clutches.

FIG. 2 illustrates a partial view of the upper half along the axis 110 of an embodiment of a rotary transfer device 109 according to the invention. Configured as a planetary gear mechanism, the device has a sun gear 113 that is press-fit or shrunk onto the shaft 112 of the electro-mechanical energy converter, a set of planet gears 114, and a ring gear 116 that is formed on the internal circumference of the housing 115 of the rotary transfer device or is connected to the housing 115.

Each of the planet gears 114 runs on an axle 118 that is held by a planet holder 117. The planet holder 117 has a radially extending flange portion 117a that receives the axles 118 and an axially extending sleeve of the shaft 112 of the electro-mechanical energy converter. The embodiment of FIG. 2 has two roller bearings 119, axially separated by a spacer ring 119a and secured on the sides by retainer rings 119b, 119c, as a tumble-free rotary support. A first overrunning clutch 120, which carries the belt pulley 121 of the electro-mechanical energy converter, is arranged on the outside circumference of the axial flange portion 117b at the end that is facing away from the radial flange portion 117a. The first overrunning clutch 120 is secured axially between a shoulder 121a and a retaining ring 121b inside the belt pulley 121. A second overrunning clutch 122 is mounted directly on the shaft 112 of the electro-mechanical energy converter, arranged inside a portion of smaller internal diameter of the belt pulley 121 towards the side that faces away from the planet gears 114. The second overrunning clutch 122 is axially constrained on one side by a shoulder 112a of the shaft 112 and on the other side by a retaining ring 112b. The belt pulley is secured against axial dislocation by the retaining rings 121b and 121c. The friction surface of the belt pulley 121 with grooves 121d receives the belt, which transfers torque from the electro-mechanical energy converter to a belt pulley on the shaft of the driving source and vice versa.

The housing 115 of the rotary transfer device 109 is completed by the planet carrier 117, so that the planet gears 114 and the roller bearings 119 are in an enclosed space, where they can be grease-lubricated or run in an oil bath. The gaps between the planet carrier 117, housing 115 and shaft 112 are closed by the seals 123, 124, 125.

A connector flange or connector bracket 126 is screwed, riveted or welded to the side of the housing that faces the electro-mechanical energy converter and serves to attach the rotary transfer device 126 to the electro-mechanical energy converter by means of holes or cutouts 126a which are arranged at a radial distance from the shaft 112.

In the presence of a torque originating from the electro-mechanical energy converter towards the driving shaft, the second overrunning clutch 122 is overrun, and the torque flows from the shaft 112 by way of the planet gears 114, the planet carrier 117 and the overrunning clutch 121 to the belt pulley 121, from where the torque is transmitted through the belt to the shaft of the combustion engine. The transfer ratio along this path is such that the rpm rate is reduced, so that the electro-mechanical energy converter can run at a higher rpm rate and correspondingly smaller torque when working in the starter mode. The torque amplification in this mode can be further enhanced with an additional step-down in the rpm rate through an appropriate selection of the belt-pulley diameters.

With a torque flowing in the opposite direction, i.e., from the combustion engine towards the electro-mechanical energy converter, the overrunning clutch 120 is overrun, and the torque is introduced directly from the belt pulley 121 through the overrunning clutch 122 into the shaft 112 of the electro-mechanical energy converter, so that the latter is driven in the generator mode without converting the rpm rate of the belt pulley 121.

Figure 3:
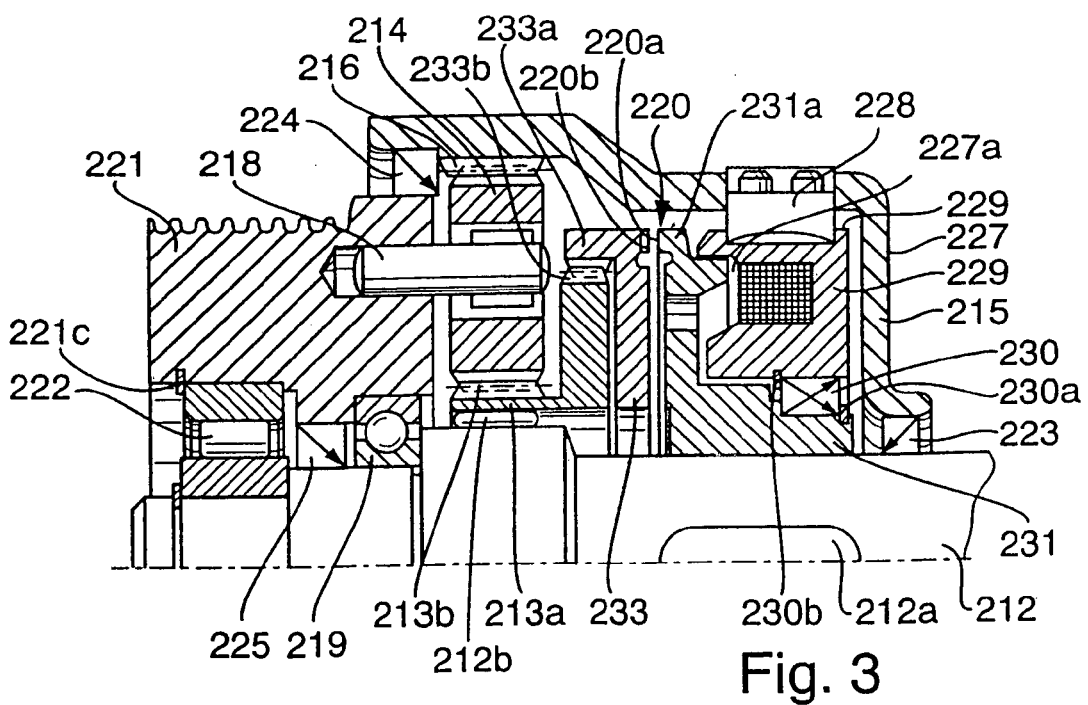
FIG. 3 represents a portion of a rotary transfer device according to the invention arranged on the shaft of the electro-mechanical energy converter, with one overrunning device and one clutch.

The rotary transfer device 209 of FIG. 3 represents a variation of the transfer device 109. A clutch 220 actuated by an electromagnet 227 is used instead of the first overrunning clutch 120 of FIG. 2.

The electromagnet 227 is surrounded by a ring-shaped armature 229 that is rotationally constrained to the housing 215. At a location on its outer radius, the electromagnet 117 has a plug connection 228 through which the electromagnet is connected to an external current source and to an actuating connection by which the electromagnet is energized, e.g., dependent on the direction of the current in the electro-mechanical energy converter. The armature is rotatably mounted on a clutch flange 231 by means of a bearing 230 that is axially secured in both directions by the retaining rings 230a, 230b. The clutch flange 231 is centered on the shaft 212 and constrained to share its rotation by means of a connector spring (not shown) that engages a groove 212a of the shaft 212 of the electro-mechanical energy converter.

A radially directed part of the clutch flange 231 forms the counter plate 231a of the clutch 220, with prongs 220a being arranged along the outer circumference of the axially facing end surface of the counter plate 231a. When the clutch 220 is engaged, the prongs 220a mesh with prongs 220b of a pressure plate 233 that is centered on the shaft 112, for a positively locked torque transfer. When the electromagnet is actuated to engage the clutch 220, the pressure plate 233 is moved axially towards the counter plate 231a as the latter is magnetized by way of the gap 227a. When the electromagnet 227 is turned off, the pressure plate 233 is moved out of engagement by means of an axially biased energy-storing device.

Continuing along the path of the torque flow, the pressure plate 233 is coupled to the sun gear 213 through an axially movable rotary constraint in the form of an internal tooth profile 233b on an axially directed extension 233a. The sun gear 213 is rotatably supported on the shaft 212 by means of an axially directed flange portion 213a containing a roller bearing 212b. The flange portion 213a also carries an external gear profile 213b that meshes with the planet gears. The axles 218 of the planet gears are connected directly to the belt pulley 221, so that the latter serves as the planet carrier for the planet gears 214. At the axial location of the planet gears 214, the housing 215 has a portion of larger diameter with an internal tooth profile 216 forming the ring gear of the rotary transfer device 209.

The belt pulley 221 is supported on the shaft 212 by means of a bearing 219 and an overrunning clutch 222, the latter being axially secured by retaining rings 221b and 221c. The gaps where the housing meets the shaft 212 and the belt pulley 221 are closed off by means of seals 223, 224 and 225.

When the clutch 220 is engaged, e.g., in the starter mode of the electro-mechanical energy converter, the overrunning clutch 222 is overrun and the vehicle engine is started by way of the sun gear 213, the planet gears 214, and the belt pulley 221, whereby the rpm rate of the electro-mechanical energy converter is stepped down to a slower rpm rate of the belt pulley. After the engine has been started and as the rpm rate increases, the clutch 220 can be disengaged at an exactly defined point, e.g. when the current in the electro-mechanical energy converter reverses its direction. The torque, which now flows back from the engine to the electro-mechanical energy converter, drives the latter directly through the shaft 212 without an rpm change of the rotary transfer device 209.

Figure 4:
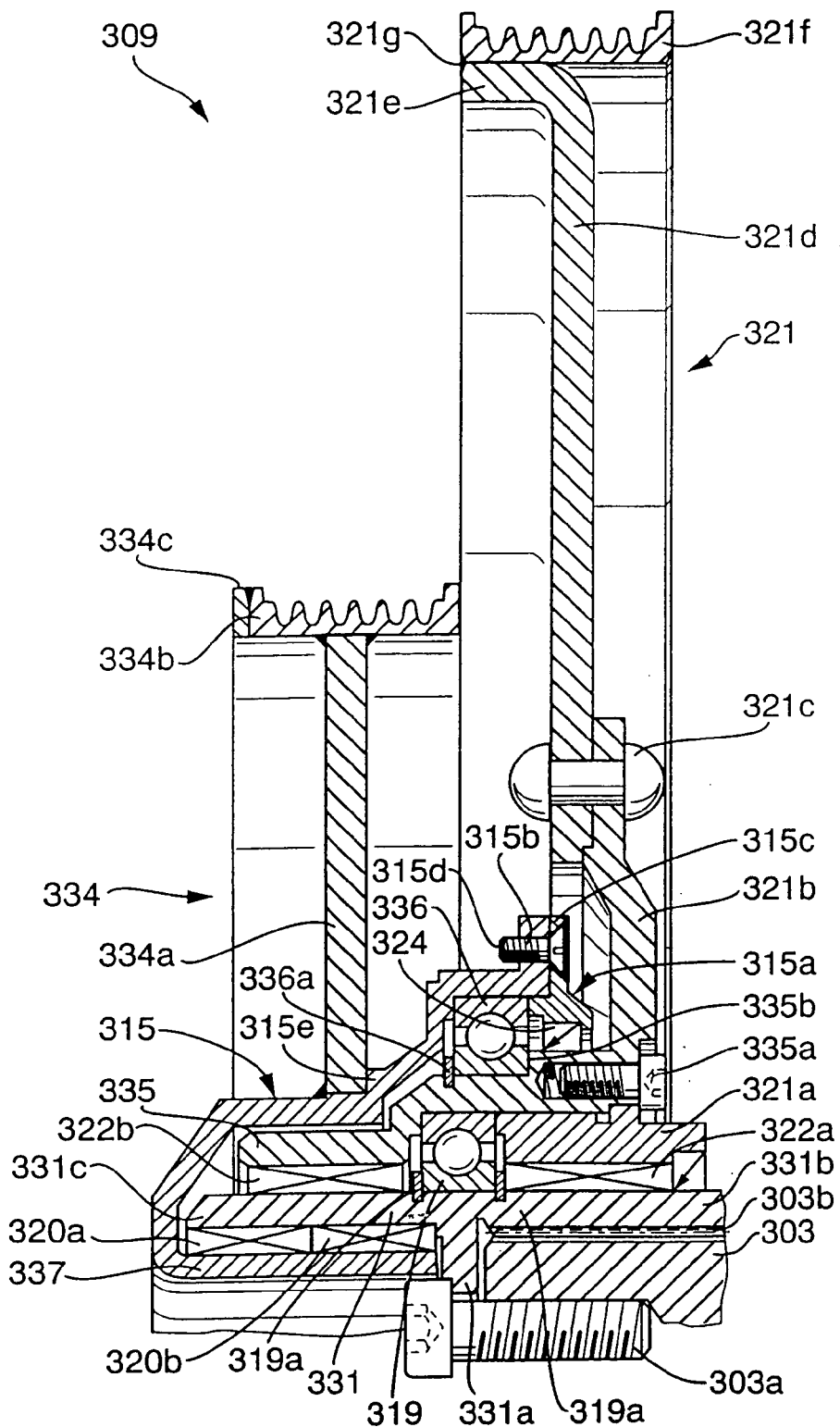
FIG. 4 represents a portion of a rotary transfer device according to the invention arranged on the crankshaft of the combustion engine (or, in general, on the output shaft of a drive source), with two belt-drive pulley pairs of different pulley diameters.

FIG. 4 represents a partial view of an embodiment of a rotary transfer device 309 that automatically shifts between two transfer ratios depending on the direction of the torque flow. This embodiment is based on two belt drives with different transmission ratios. Only one side of the dual belt drive is shown, i.e., the pulleys 321 and 334 with the rotary transfer device 309.

A ring-shaped axially extending flange 331 of the rotary transfer device 309 has an internally directed flange 331a located about halfway between the axial ends of the flange 331. A screw 303a connects the flange 331a to the driving shaft 303 of the combustion engine, while a rotationally locked engagement between the axially extending flange 331 and the driving shaft 303 is established through the splines 303b. A first ring-shaped portion 331b of the flange 331 extends axially over the driving shaft 303, while a second portion 331c extends in the opposite axial direction, so that the outer circumference of the ring-shaped flange 331 provides a mounting base for the first overrunning clutches 322a, 322b and the roller bearing 319. The latter lies axially in between the overrunning clutches and is axially secured by means of retaining rings 319a. The overrunning clutch 322a, which is located on the portion 331b of the ring-shaped flange 331, is surrounded by an axially extending flange-part 321a that is connected to a radially oriented flange-part 321b. Attached to the latter by means of rivets 321c is a ring-disc part 321d turning at its outside radius into an axially directed rim portion 321e facing away from the driving shaft 303. The belt-pulley ring 321f is mounted on the rim portion 321e by means of a weld 321g. The flange parts 321a, 321b, 321d can also be designed in one integral piece. To enhance the torque-transmitting capacity, a further flange part 335 is arranged and centered on the overrunning clutch 322b, the roller bearing 319, and the outer circumference of the axially oriented flange part 321a. The further flange part 335 is attached to the flange part 321a by means of screws 335a distributed at substantially equal intervals over the circumference. A roller bearing 336 is arranged on the outer circumference of the flange part 335 at a radially projecting shoulder 335b and secured by a retaining ring 336a. The roller bearing 336 rotatably supports the housing 315. To secure the housing against axial movement and for sealing purposes, the end of the housing is closed off with a cover 315a that is fastened to a radial flange 315c of the housing by circumferentially distributed screws 315b, positioning the housing axially against the roller bearing 336 by means of an axially directed nose 315d and sealing the housing against the flange part 335 by means of a seal 324. To optimize the space filled by the housing, the latter is designed to follow the radial contour of the flange parts 331 and 335. At the farthest point from the driving shaft 303, the housing contour is drawn inwards to form an axial flange 337. The outside circumference of the flange 337 supports the overrunning clutches 320a, 320b, which in turn receive the flange part 331c of the flange 331 that is rigidly connected to the driving shaft 303. A radially projecting shoulder 315e at an intermediate axial location of the housing contour serves as a seat for a belt pulley 334. The latter consists of a ring-disc part 334a, a belt-pulley ring 334b to receive the belt, and a reinforcing ring 334, where the three last-named parts are welded to each other.

In the starter mode of the rotary transfer device 309, the electro-mechanical energy converter drives both of the belt pulleys 321, 334 through their respective belts (not shown) Assuming equal pulley diameters on the side of the electro-mechanical energy converter, the pulley 321 due to its bigger diameter has the greater rpm reduction ratio than the pulley 334. Therefore, the overrunning clutches 322a, 322b are designed to be locked while the overrunning clutches 320a, 320b are designed to be overrun in the starter mode, so that the torque produced by the electro-mechanical energy converter is introduced to the driving shaft by way of the flange parts 321b, 321a and the flange 331.

In the generator mode of the electro-mechanical energy converter, the overrunning clutches 322a, 322b are overrun while the overrunning clutches 320a, 320b are locked. The torque-flow path in this case leads from the driving shaft 303 through the flange 331, the overrunning clutches 320a, 320b, and the housing 315 to the belt pulley 334. With its smaller diameter, the belt pulley 334 drives the electro-mechanical energy converter at an rpm ratio that is better suited for the generator mode. The two rpm ratios depend on the respective diameter ratios of the pulleys in the two belt drives. The two rotary transfer ratios can be superimposed on a common base ratio.

Figure 5:
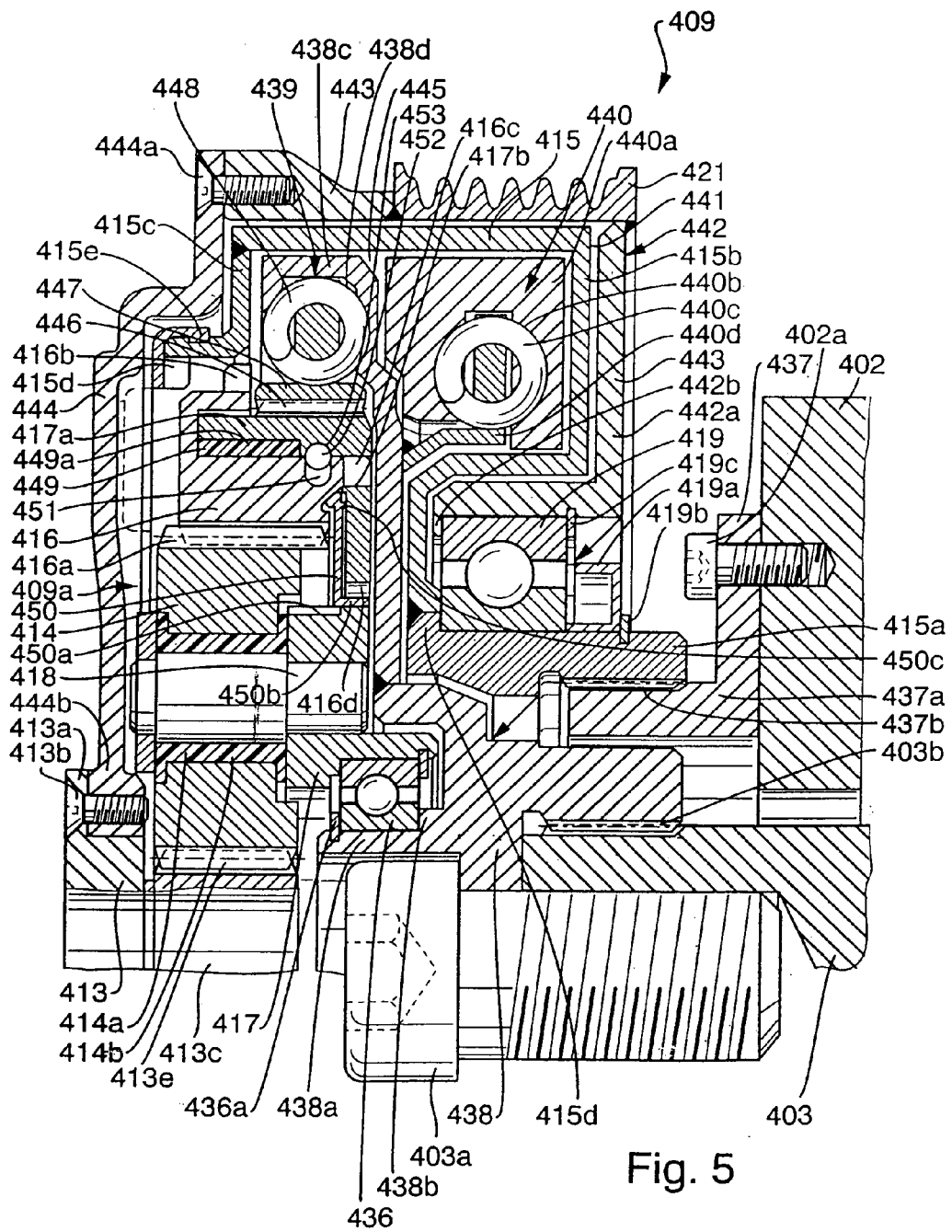
FIG. 5 represents a portion of a rotary transfer device according to the invention arranged on the output shaft of the combustion engine, with an axially movable ring gear.

FIG. 5 illustrates an embodiment of a rotary transfer device 409 in accordance with the invention. The rotary transfer device 409 is mounted on the driving shaft 403 by means of a support flange 438, attached by a screw 403a that is accessible through a round opening 413c in the sun gear 413. The housing 415 is centered on the engine housing 402 by means of a flange part 437 of L-shaped cross-section that is rigidly attached to the engine housing through a set of screws 402a distributed along a circle. The axial leg 437a of the L-shaped flange part 437 is inserted into a matching recess of the housing 415 and rotationally locked to the latter through splines 437b.

The housing 415 consists of the housing portions 415a, 415b, 415c that are welded together, but it can also be formed integrally like the other components through appropriate shaping techniques. Enclosed by the housing 415 is a chamber 445 containing the damper device 439, the shock absorber 440, as well as the planetary gear mechanism 409a with its sun gear 413, planet gears 414 and the axially movable and rotatable ring gear 416.

A roller bearing 419 is arranged on the outer circumference of the flange part 415a, seated against a radially projecting shoulder 415d of the flange part 415a. The roller bearing is seated without axial play against an elongated leg of a U-profiled ring 419a that is open towards the roller bearing 419 and is axially secured by a retaining ring 419b. The roller bearing 419 rotatably supports the belt-pulley cage 442 on the housing 415. The belt-pulley cage 442 is shaped to follow the contour of the housing 415 with a minimal gap 441. It consists of the L-shaped flange 442a, belt-pulley 421, connector ring 443 and disc part 444, and it is axially secured on the roller bearing 419 by a radially inward-projecting nose 442b of the axial portion of the flange 442a and by the retainer ring 419c. At the outer circumference of its radial portion, the L-shaped flange 442a carries the belt pulley 421, which is ring-shaped and welded to the L-shaped flange. The other side of the ring-shaped belt pulley 421 is welded to the axially adjacent connector ring 443, to which the disc part 444 is connected by means of screw 444a. The disc part 444 has at its inner circumference a reinforced rim 444b protruding axially in both directions. The reinforced rim 444b has threaded holes distributed over its circumference, where an outward-projecting flange 413a of the sun gear 413 is attached by means of screws 413b, whereby a sealed and rotationally fixed connection is established between the sun gear 413 and the disc part 444.

The planet carrier 417 of the planetary gear mechanism 409a holds the planet gears 414 by means of the axles 418 and the interposed bearings 414a, 414b. An axial projection 438a of the support flange 438, which is attached to the driving shaft 403, rotatably supports the planet carrier 418 by means of a roller bearing 436 that is axially secured by the radially projecting shoulder 438b and the retainer ring 436a. The planet carrier 417 has at its outer circumference a form-fitting connection to the damper device 439 by way of the gear profile 446.

Based on its functional principle, the dual-ratio transfer device 409 provides an rpm reduction from the electro-mechanical energy converter to the engine, e.g., when working in the starter mode. With the geometry according to the illustrated embodiment, the reduction ratio is 1:5. The torque-flow path leads from the belt-pulley 421 through the disc part 444 to the sun gear 413. Through the helical gear profile 413e, the sun gear 413 drives the (preferably three) planet gears 414. The planet carrier 417 is opposed by the driving shaft through the damper device 439, so that the ring gear 416, because of its helical gear profile 416a, is pushed axially to move away from the driving shaft 403, so that a form-locking engagement is established between the prongs 416b and 415d on the ring gear 416 and housing 415, respectively. The helical pitch of the gear profile 416a is selected so that the ring gear 416 is pushed in the aforementioned axial direction already at a torque that is smaller than the opposing torque of the driving shaft 403, against the three-part slide bearing 449 with the radially acting annular spring 449a, which is provided to direct the frictional torque load acting between the axial flange part 417a of the planet carrier 417 and the ring gear 416. To keep the ring gear from moving too far, a retainer ring 415e is snapped onto the housing part 415c at the end of the prongs 415d. By the form-locking engagement of the prongs, the ring gear 416 is coupled to the housing 415, so that the driving shaft is rotationally coupled to the output part 438c (at the transfer ratio of the planetary gear mechanism 409a) as the gear profile 446 engages the input part 447 which, in turn, acts through the energy-storing devices 448 on the output part 438c. The latter has pockets 438d to receive and compress the energy-storing devices 448, so that the input part 447 and the output part 438c are rotatable in relation to each other against the opposing force of at least one energy-storing device 448 that extends over at least a part of the circumference and serves to dampen rotary perturbations in the power train. The torque is transferred from the output part 438c to the driving shaft 403 by way of the support flange 438. As mentioned above, this torque-flow pattern represents the starter mode, where the combustion engine is started at an rpm rate that is reduced from the rpm rate of the electro-mechanical energy converter.

An absorber 440 for rotary shocks and vibrations is arranged parallel to the damper device 439. The absorber 440 includes a ring-shaped mass 440a with at least one pocket 440b in which an energy-storing device 440c is seated, extending over at least part of the circumference. The ring-shaped mass 440a is rotatable relative to the input part 438d that is connected to the support flange 438 (e.g., by welding) against the opposing force of the energy-storing device 440c.

After the engine has been started, the direction of the torque flow is reversed, i.e., the torque now originates from the driving shaft 403. The planet carrier 417 is opposed by the inertia of the electro-mechanical energy converter, and because of the torque interacting with the helical tooth profile, the ring gear is pushed axially towards the side of the driving shaft. This causes a form-locking engagement between the prongs 416c on the ring gear 416 and corresponding windows or cut-outs 417b of the planet carrier 417.

As the aforementioned form-locking engagement takes place while the planet carrier 417 is already in motion and the ring gear 416 is approximately standing still, there is an engagement-blocking ring 450 provided to protect the prongs 416c from damage. The blocking ring 450 has on its outside a conical friction-contact engagement with the ring gear 416, while an inward-directed nose 450a of the blocking ring 450 engages a corresponding groove of the planet carrier with play. When the rpm-rates of the ring gear 416 and the planet carrier 417 are approximately equal—and as a result of the torque being transmitted through the helical gear profile 416a—the teeth of the axially directed tooth profile 450b of the blocking ring 450 engage the matching circle of holes 416d of the ring gear, in opposition to the force of the axially biased energy-storing device 450c, and thereby open the way for the engagement between the prongs 416c and windows 417b to take place. When the torque-flow direction is reversed, the parts 450b, 416c are disengaged from each other as the energy-storing device 450c moves the blocking ring 450 axially apart from the planet carrier 417.

After the form-locking engagement between the prongs 416c and the windows 417b has been established, the planet carrier 417 turns directly with the planet gears, as the ring gear 416 is locked to the planet carrier. The torque flows without rpm change by way of the axles 418 and the planetary gears 414 to the sun gear 413 and from there through the disc part 444 to the belt pulley 421 which, by way of the belt (not shown) drives the electro-mechanical energy converter.

If the electro-mechanical energy converter is operated in a booster mode, i.e., to assist the engine, or if it is to be used as the sole source of propulsion for the vehicle (where the torque flow is originating from the electro-mechanical energy converter), it is desirable to have a means of preventing the rotary transfer device from shifting into the starter-mode transfer ratio when the rpm-rate is more than the starter-mode rpm rate. This is accomplished with a centrifugal device with spherical balls, ring segments, or pins 452 that are resting in recesses 451 distributed over the outside circumference of the planet carrier 416 and are pulled by a centrifugal force into engagement with matching recesses 453 in the ring gear, so that the planet carrier 416 and the ring gear 417 are rotationally interlocked at higher rpm-rates. If the engine comes to a stop, then the spherical balls or other centrifugal elements 452 can be returned to the recesses 451, substantially without applying a force. To facilitate the foregoing process, the rims of the recesses 451, 453 can be shaped appropriately, for example with profiles that are suitably tapered off in the radial and circumferential directions, or the balls may be push back into their recesses by small springs.

Figure 6:
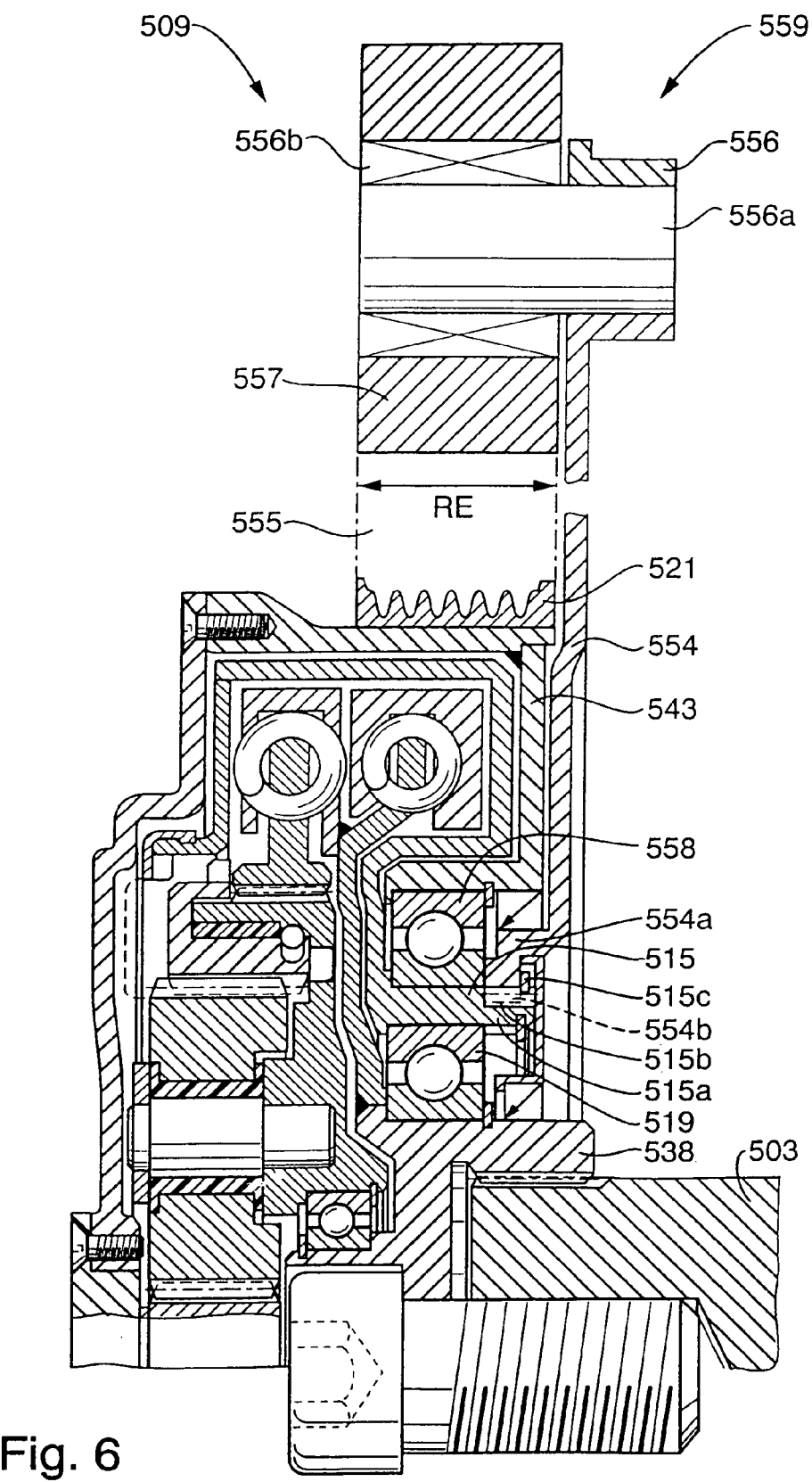
FIG. 6 represents a portion of a rotary transfer device according to the invention, arranged on the output shaft of the combustion engine in a statically indeterminate configuration, with an axially movable ring gear.

FIG. 6 illustrates a rotary transfer device 509 that is analogous to the device 409 of FIG. 5 with regard to function and spatial arrangement, except for the following differences:

The housing 515 of the rotary transfer device 509 is not bolted onto the engine housing but is supported in a statically indeterminate arrangement where the reactive torque of the housing 515 is taken up by lever 554 that extends radially along the plane defined by the belt pulley 521 and the belt-pulley of the electro-mechanical converter (not shown) and bears against the belt 555 (indicated symbolically). In this case the engine housing does not need to be modified, and the rotary transfer unit 509 can be used without design modifications of the engine. The radially outer end of the lever 554 has an axially extending seat 556 for a shaft 556a which supports a belt-tensioning pulley 557 on a bearing 556b. Depending on the direction of the torque, the belt-tensioning pulley 556b pushes against one side or the other of the belt 555 pulley with a force that is in proportion to the amount of torque being transmitted through the belt, so that the belt tension is smaller when there is only a small amount of torque present, whereby the useful lives of the belt and the bearings 519 and 558 are extended. The lever 554 is connected to the housing 515 by means of a ring 554a that is formed at the end of the lever with an axial offset towards the housing 515. An internal tooth profile of the ring 554a engages an external tooth profile 515b of the housing 515 to establish a rotationally fixed connection, and a retaining ring 515c secures the ring 554a in the axial direction without play. To prevent the housing 515 from getting out of alignment with the plane of rotation of the engine, an additional roller bearing 558 is arranged between the support flange 538 (which is spline-mounted on the driving shaft 503) and the housing 515, as a rotary support between the housing 515 and the belt-pulley cage 543. Both of the roller bearings 519 and 558 are arranged within the running plane RE of the belt-pulleys, in order to avoid reactive moments caused by leveraged forces. According to the invention, additional auxiliary devices can be operated on the belt drive, whose bearings will likewise benefit from the leverage-free arrangement. The belt 555 can be pre-tensioned with a base amount of force to ensure the proper functioning of the belt drive.

Figure 7:
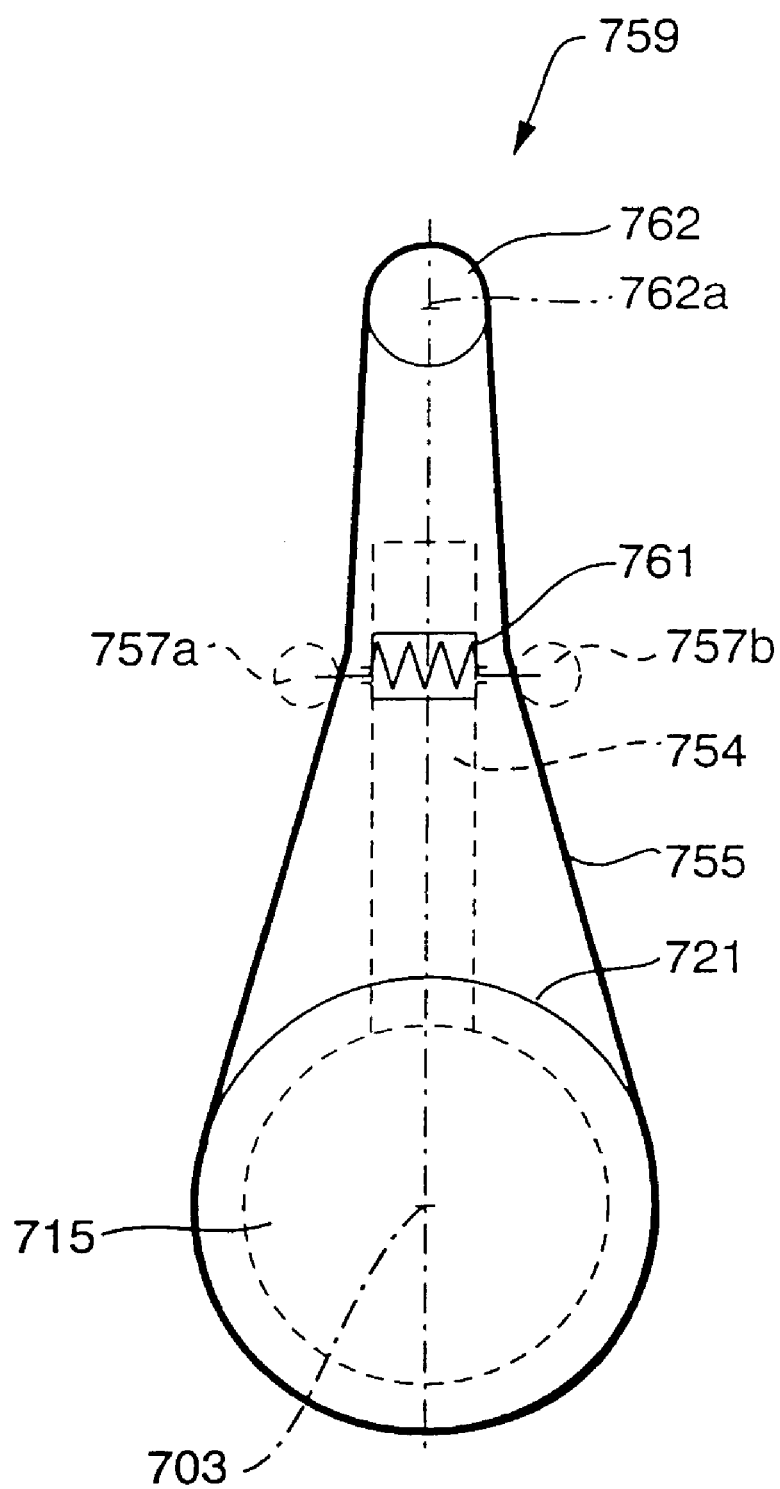
FIG. 7 represents a simplified sketch of a pair of belt pulleys with a tensioning device.

FIG. 7 illustrates an embodiment of a belt drive 759 in a schematically simplified format. A lever 754 is attached to the housing 715 of a rotary transfer device. An energy-storing device 761 connecting the tensioning pulleys 757a and 757b directly to each other and pulling them towards each other is attached to the lever 754. The two stretches of the belt 755 run between the tensioning pulleys 757a, 757b and the energy-storing device 761, so that the belt 755 (which connects the belt pulleys 762, 721 on the respective axes of rotation 703, 762 of the engine and the electro-mechanical energy converter) is pre-tensioned on both sides by the force of the energy-storing device 761. Additional auxiliary devices can be incorporated in the belt drive 759, as well as in any other embodiment of an interactive connection between the driving shaft and the shaft of the electro-mechanical energy converter.

Figure 8:
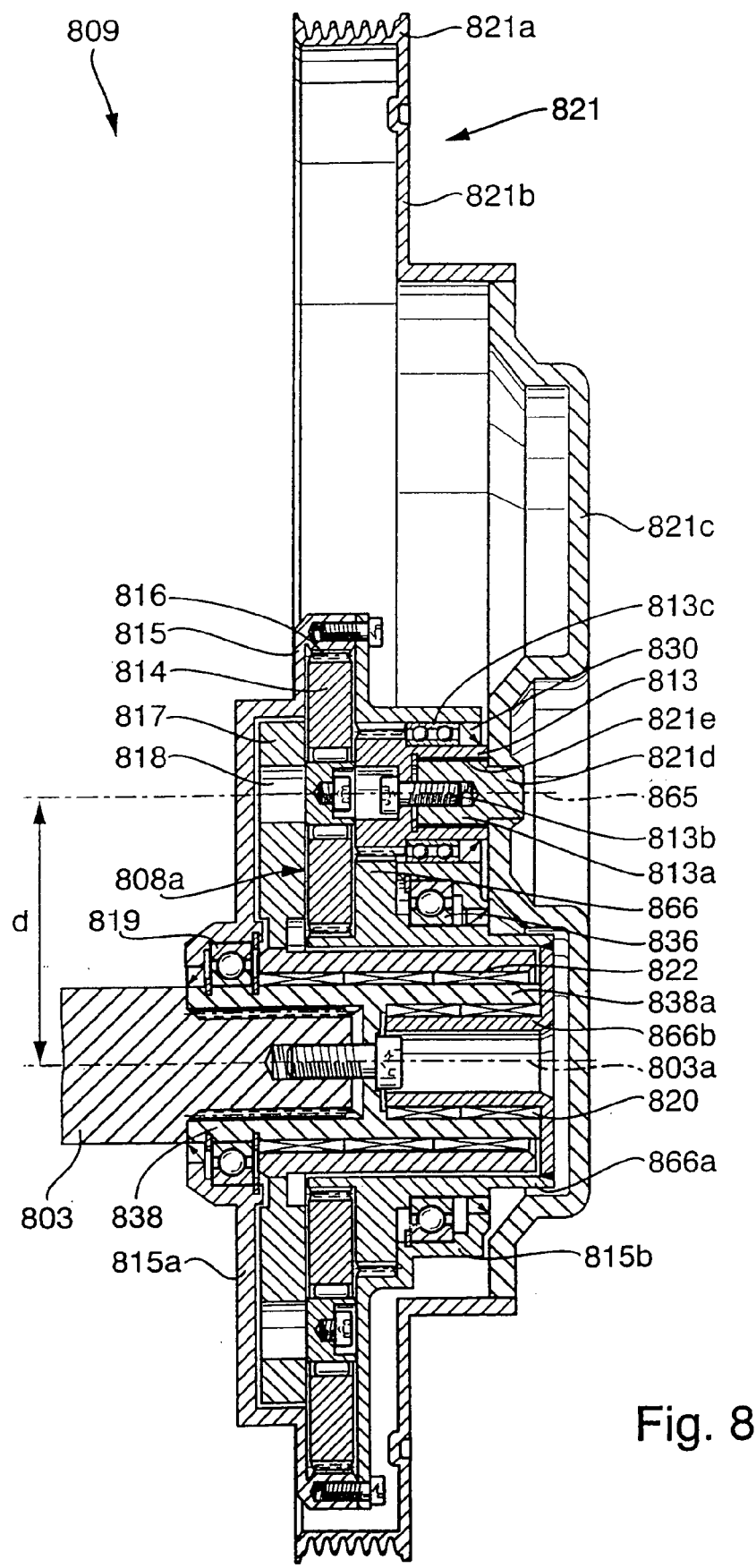
FIG. 8 represents a portion of a rotary transfer device according to the invention arranged on the crankshaft, where a belt-drive pulley on the side of the crankshaft is offset from the longitudinal axis of the latter.

In the embodiment of a rotary transfer device 809 according to FIG. 8, the driving shaft 803 and the belt pulley 821 are arranged on two different axes 803a and 865, respectively, at a distance d from each other. The belt pulley 821, from its outer radius towards the axis 865, is composed of a belt-contact surface 821a, an L-shaped flange 821b, a disc part 821c receding axially in the radial range of the driving shaft 803 so as to accommodate the planetary gear mechanism 809a, as well as a hub 821d with an external spline profile 821e, where all of the foregoing parts of the belt pulley 821 are welded to each other. The gear 813 is rotationally locked to the hub 821d through an internal spline profile 813a and held in place by the screw 813b. The gear 813 with the belt pulley 821 is support in the housing 815 by means of the roller bearing 813c. The housing 815 surrounds the gear 813 on its circumference, and a gap between the housing and the gear is closed off by a seal 830. The gear 813 meshes with a further gear 866, which bridges the distance d and forms the sun gear of the planetary gear mechanism 809a arranged on the shaft 803 with the central axis 803a. The sun gear 866 meshes with the planet gears 814 that are supported by means of their axles 818 on the planet carrier 817, while the housing 815 (consisting of the parts 815a and 815b) carries an internal tooth profile 816 that forms the ring gear. The housing 815 is supported on the one hand by the axially secured and sealed roller bearings 819, 836 on the support flange 838 that is splined and screwed onto the driving shaft 803, and on the other hand on an axial projection 866a of the sun gear 866. The latter, in turn, runs on two overrunning clutches 820 that are arranged between the outer circumference of an L-shaped flange 866b and the internal circumference of an axial extension 838a of the carrier flange 838 on the side that faces away from the driving shaft 803. The clutches 820 are arranged as a parallel pair with the same overrunning direction, in order to achieve a larger torque-transmitting capacity. The planet carrier 817 runs on a triplet of parallel overrunning clutches 822 arranged on the outside circumference of the support flange 838. The respective directions of the overrunning clutches 820, 822 are selected appropriately, so that as a result, the rotary transfer device 809 will work as follows:

In the case where a torque originates from the driving shaft 803, the overrunning clutch 820 is engaged, so that the torque is transmitted from the shaft 803 to the sun gear 866, while the clutch 822 is overrun. The torque is transferred to the gear 813 and passed on to the belt pulley 821, from where it is transmitted by way of the belt to the electro-mechanical energy converter. At the beginning of this phase, the belt-pulley axis 865 is rotated about the axis 803*a* of the driving shaft 803 up to the point where the rotation is constrained by the belt that is thereby being tightened. The offset d between the axes 803*a* and 865 needs to be large enough so that at a given amount of belt tension and dependent on the amount of friction at the pulley contact surface 821*a*, the axis 865 cannot slip through and make a full turn about the axis 803*a*. This can under normal conditions be prevented, if d is larger than 10 mm. The upper limit for the distance d depends on the dimensional constraints for the installation of the transfer device 809 and may be as high as 250 mm.

In an operating situation where the torque flow is directed from the electro-mechanical energy converter by way of the belt pulley 821 into the rotary transfer device 809, the latter will turn in the opposite direction about the axis 803*a* until it is again constrained by the tension of the belt from turning further. The torque is now transmitted from the gear 813 to the sun gear 866 which, in turn, drives the planet gears 814, while the clutch 820 is overrunning. The torque-flow path continues—with a reduction of the rpm rate according to the transfer ratio of the planetary mechanism—through the planet carrier 817, the now engaged overrunning clutch 822, and the support flange 838 to the driving shaft 803, whereby the engine is started up.

Figure 9:
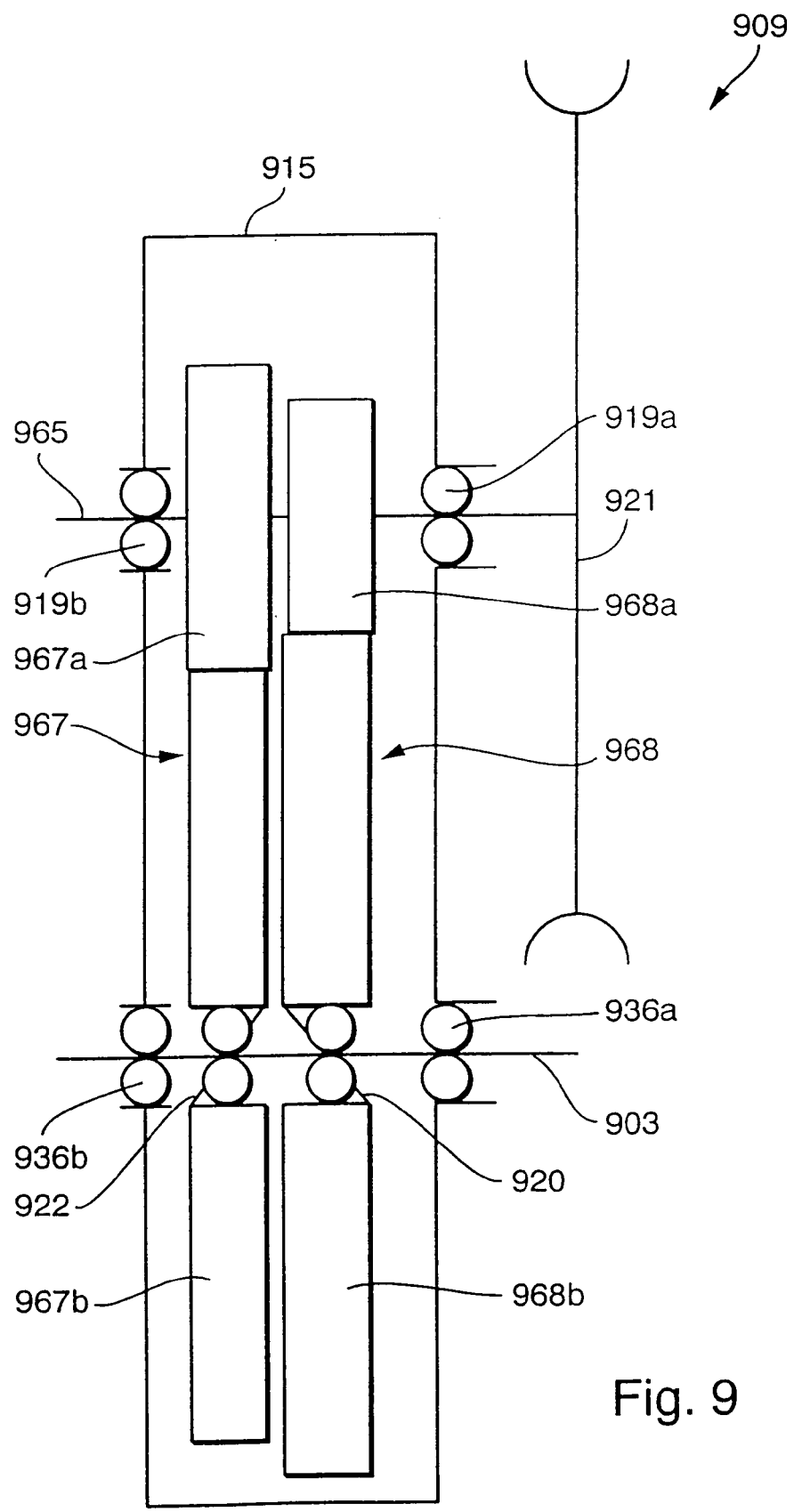
FIG. 9 represents a simplified sketch illustrating a crankshaft-mounted spur gear device according to the invention, where a belt-drive pulley associated with the crankshaft is offset from the longitudinal axis of the latter.

FIG. 9 schematically illustrates an example of a rotary transfer device 909 where the axis 965 of the belt-pulley 921 is offset from the axis 903 of the driving shaft. The transfer device 909 consists of two spur-gear pairs 967, 968. Two overrunning clutches 920, 922 are arranged to automatically shift between the two transfer ratios corresponding to the two directions of the torque flow.

The first gears 967*a*, 968*a* of the pairs 967, 968 are rotationally fixed on the belt-pulley shaft 965, while the second gears 967*b*, 968*b* are connected to the driving shaft 903 through the overrunning clutches 920, 922 with opposite overrunning directions. The housing 915 surrounds the rotary transfer device 909 and is supported on the shaft 903 by means of roller bearings 936*a*, 936*b*.

In the starter mode, the overrunning clutch 920 is engaged, while the overrunning clutch 922 is being overrun, i.e., idling in a freewheeling state, so that the rpm rate from the electro-mechanical energy converter is reduced in the transfer to the driving shaft 903. In the generator mode, the overrunning clutch 922 is engaged, while the overrunning clutch 920 is freewheeling. The respective gear diameters are selected such that the step in rpm rates is smaller in the generator mode. As described in the context of FIG. 8, the housing 915 of the rotary transfer device is constrained by the belt, so that it is not necessary to anchor the housing 915 on the engine housing.

Figure 10:
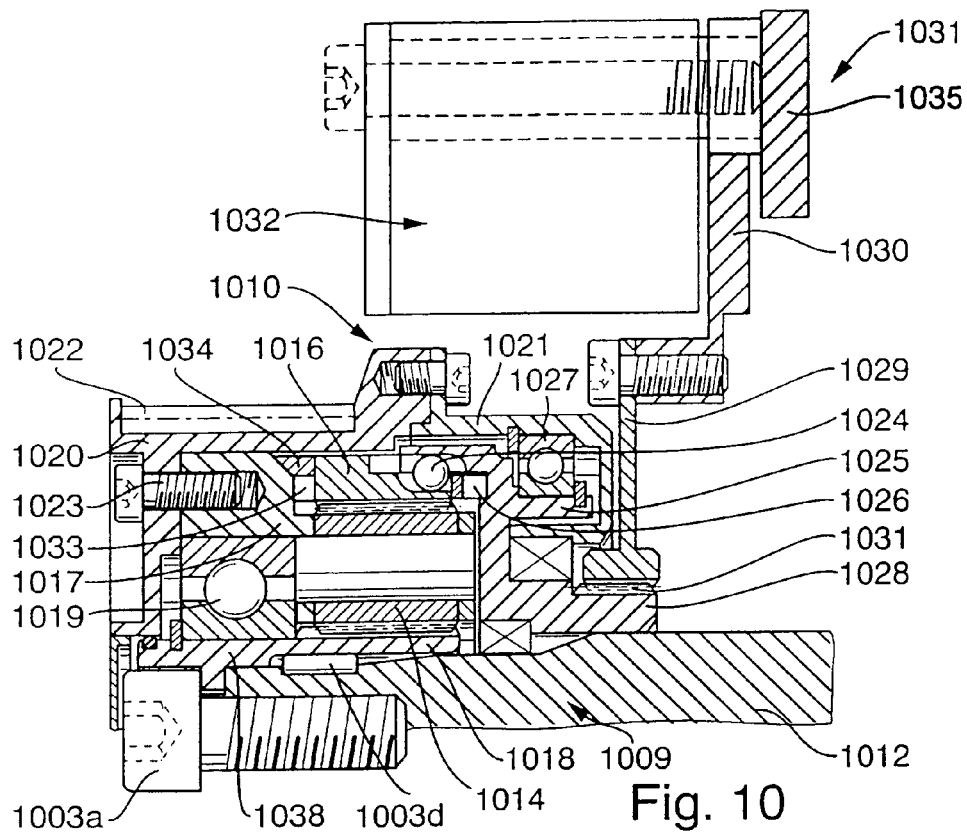
FIGS. 10–17 illustrate further possible embodiments and arrangements of elements pertaining to the subject of the present invention.

The rotary transfer device 1009 shown in a sectional view in FIG. 10 is supported directly by an electrical starter/generator by means of a sleeve-shaped connector 1038 that is mounted on the shaft 1012 of the electro-mechanical energy converter. (The latter is not shown in the drawing.) The mounting attachment includes a form-locking connector element 1003*d* to transmit torque, and a bolt 1003*a* to secure the connector 1038 in the axial direction.

The rotary transfer device 1009 has a housing 1010 to accommodate the elements of a planetary gear mechanism, specifically the ring gear 1016, the planet gears 1014, the planet carrier 1017, the sun gear 1018, as well as a number of actuating- or shifting elements.

The housing 1010 is mounted rotatably in relation to the sleeve-shaped connector 1038, in the illustrated arrangement by a roller-bearing arrangement 1019, specifically a ball bearing. The housing 1010 includes a ring-shaped component 1020 of angular cross-section, which is connected to a second housing component 1021, in the illustrated case by means of screws. The housing part 1020 carries a surface profile 1022, preferably for an endless loop-type of transfer device such as in particular a spur belt. In the illustrated example, the surface profile 1022 is formed directly on the housing part 1020.

The gears 1014, 1016, 1018 of the planetary gear mechanism 1009 are helical gears. The ring gear 1016 is mounted with axial mobility within the housing 1010. In addition, the ring gear 1010 is rotatable in relation to the sun gear 1018. In the embodiment of FIG. 10, the sun gear 1018 is formed directly on the hub-like connector part 1038. The ball bearing of the bearing arrangement 1019 is also received directly on the connector part 1038.

The housing part 1020 forms a belt pulley and is rigidly attached to the planet carrier 1017 through bolted connections 1023. The axially movable ring gear 1016 is coupled through a ball-ramp mechanism 1024 to a ring-shaped component 1025 that surrounds the shaft 1012. An energy-storing device in the form of a wave-shaped spring 1026 is axially pre-tensioned between the ring gear 1016 and the ring-shaped component 1025. The ring-shaped component 1025 is rotatably supported in the housing 1010—specifically on the housing part 1021—by a bearing 1027. The bearing 1027 also holds the ring-shaped component 1025 at an axially fixed position within the housing. The bearing 1027 is designed to take up axial forces that are generated by the ball-ramp mechanism 1024, as will be described below in more detail. The ring-shaped component 1025 has at its inner radius an axial extension 1028 supporting a clutch disc 1029. At least the friction-generating portions 1030 of the clutch disc 1029 are axially movable within a limited range. In the illustrated embodiment, the axial mobility is achieved by an axial tooth- or spline profile 1028*a* at the interface between the clutch disc 1029 and the axial extension 1028. However, the friction-generating portions 1030 could also be made axially movable by using a flexible connection with the ring-shaped component 1025, such as a diaphragm spring or leaf springs. The clutch disc 1029 is part of a brake- or clutch device 1031 which can be configured, e.g., as an electromagnetic brake or clutch. An electromagnet 1032 is schematically indicated in FIG. 10.

As mentioned above, the ring gear 1016 is axially movable, so that the helical tooth profiles of the planetary mechanism 1009 will cause the ring gear 1016 to move either to the right or to the left depending on the direction of the torque flow. In other words, the direction of the horizontal force component acting on the ring gear 1016 depends on whether the electro-mechanical energy converter is working in the starter mode or the generator mode.

The ring gear 1016 can be rotationally coupled to the housing 1010 by means of a clutch 1033. The clutch 1033 in the illustrated embodiment is configured as an axial dog clutch, where the mating parts can have a sawtooth profile arranged on a circumference. The saw-tooth profiles of the dog clutch may serve the purpose of generating on the ring gear an axial pushing force that depends on the torque direction. The saw-tooth profiles may further be designed so that the dog clutch works as an overrunning clutch that allows a relative rotation between the housing 1010 and the ring gear 1016 in one direction while providing a form-locking torque transfer in the other direction. As a result, when the clutch 1033 is engaged, the ring gear 1016 is rotationally locked in relation to the housing, and thus to the planet carrier 1017, so that the planetary mechanism is short-circuited, which means that the rotary transfer ratio between the shaft 1012 and the housing 1010 is 1:1. Preferably, the transfer device 1009 is configured to work at the 1:1 ratio when the electro-mechanical energy converter is working in the generator mode, where the clutch 1031 is in the disengaged condition.

The transfer device 1009 further includes an engagement-blocking ring 1034 which provides at least a certain degree of synchronization between the ring gear 1016 and the planet carrier 1017, before they can be engaged to each other through the mating profiles of the dog clutch 1033. Part of the axial force for engaging the clutch 1033 can be applied by way of the energy-storing device that may have the form of a wave-shaped spring 1026. The helical profiles of the gears 1014, 1016, 1018 are preferably designed so that with a torque-flow direction from the vehicle engine to the electro-mechanical energy converter (i.e., when the latter is working in a generator mode), the resultant axial force component will push the ring gear 1016 to the left, whereby the clutch 1033 is engaged and the planetary gear mechanism 1009 is locked up. In this operating mode, the ring-shaped component 1025 and the clutch disc 1029 connected to it are idling along. The axial force that is exerted by the ball-ramp mechanism 1024 on the ring-shaped component 1025 is taken up by the bearing 1027.

When the clutch or brake 1031 is engaged, the ring-shaped component is constrained from rotating, so that in the generator mode of the electro-mechanical energy converter, the helical profiles of the transfer device 1009 will exert a rightward push on the ring gear 1016. The clutch device 1031 and the ramp mechanism 1024 thus have to take up a torque in the opposite direction compared to the torque that occurs in the starter mode of the electro-mechanical energy converter. The ramp mechanism 1024 is configured so that when the brake or clutch 1031 is applied, the ring gear 1016 will first be moved out from its leftmost position to the right against the axial force of the energy-storing device 1026 and then locked into position in relation to the component 1025. As a result, the clutch 1033 becomes disengaged, so that the planetary gear device 1009 will perform its rpm-converting function. Disengaging the clutch device 1031 will allow the ring gear 1016 to be accelerated by the torque of the belt drive, and at the same time, the axially acting energy-storing device 1026 will push the ring gear to the left. After the rpm rates of the ring gear 1016 and the planet carrier 1017 have been at least approximately synchronized, the clutch 1033 will again be engaged and the rpm-converting function of the planetary gear mechanism will be overridden, i.e., the rotary transfer device returns to a direct-driving mode at a ratio of 1:1. When the planetary mechanism is in its rpm-converting mode, the ratio factor is preferably in the range between 1.5 and 5, and with particular preference between 2 and 4.

The clutch or brake device 1031 is supported advantageously by the housing 1035 (indicated schematically) of the electro-mechanical energy converter that runs on the shaft 1012. Preferably, the rotor of the electro-mechanical energy converter is mounted directly on the shaft 1012.

Figure 11:
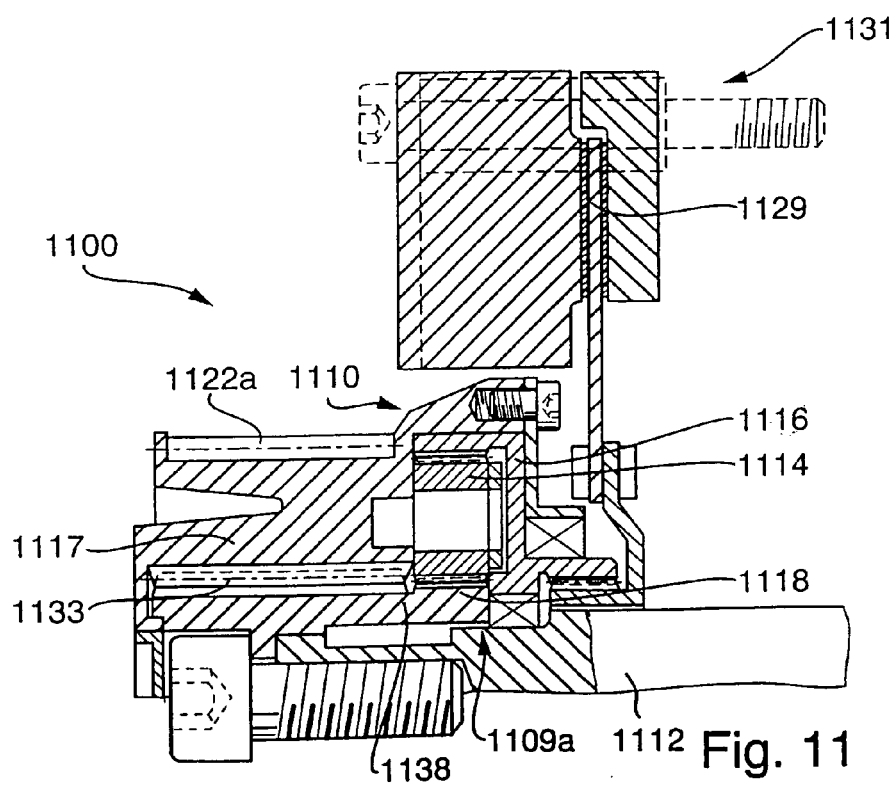

The embodiment of an electro-mechanical energy converter 1100 that is illustrated in FIG. 11 has a belt pulley 1122 with a spur profile 1122a. In this embodiment, too, the belt pulley 1122 forms part of a housing 1110 in which a planetary gear mechanism 1109a is accommodated. The planetary mechanism 1109a has a connector part 1138 that is firmly attached to the shaft 1112 of the electro-mechanical energy converter, analogous to the part 1038 on the shaft 1012. The connector part 1038, configured as a sleeve, carries a sun gear 1118, which is in this case made of one piece with the connector part 1138. The planet carrier 1117, likewise, is made of one piece with the belt pulley 1122. The ring gear 1116, arranged rotatably inside the housing 1110, is connected to a clutch disc 1129, the latter being part of a clutch device 1131 that can be shifted into and out of engagement depending on certain operating states of a combustion engine of a vehicle that is coupled to the electro-mechanical energy converter by the belt drive that contains the pulley 1122. The clutch device 1131 can be configured as, or it can contain, an electromagnetic clutch or brake. The ring gear 1116, sun gear 1118, and planet gears 1114 of the planetary mechanism 1109a are preferably spur gears, i.e., gears with teeth that are cut parallel to the axis.

The belt pulley 1122 is mounted rotatably in relation to the connector part 1138 by means of an overrunning clutch bearing 1133. The overrunning clutch 1133 essentially performs the function of the clutch 1033 of FIG. 10. The embodiment of FIG. 11 has the advantage that no axial forces are generated in the transfer device and no ramp mechanism is required, in contrast to the embodiment of FIG. 10.

In the starter mode, the clutch 1131 is brought into engagement, whereby the ring gear 1116 is immobilized. Constraining the clutch disc 1129 puts the planetary mechanism 1109a into the larger transfer ratio. The planetary mechanism 1109a is designed so that with the ring gear 1116 arrested, the freewheeling clutch bearing 1133 between the sun gear 1118 and the planet carrier 1117 is overrun when the electro-mechanical energy converter on the shaft 1112 is in the starter mode. As soon as the combustion engine starts up and reaches a sufficient rpm rate, the torque will begin to flow in the opposite direction, meaning that the electro-mechanical energy converter will now be driven by the engine, i.e., it will now operate in the generator mode. If the clutch disc 1129, and thus the ring gear 1116, were still kept from rotating, the planetary gear mechanism 1109a would, however, continue to work at the transfer ratio of the starter mode. If, on the other hand, the clutch disc 1129 is released, the ring gear 1116 will be able to rotate freely, and no power can be transmitted in the generator mode from the belt pulley 1122 to the shaft 1112 through the gears of the planetary mechanism 1109a, which causes the freewheeling clutch bearing 1133 to become engaged so that the belt pulley 1122 turns synchronously with the shaft 1112. If the ring gear 1116 is constrained, the shaft 1112 will turn faster than the belt pulley 1122 in the generator mode, so that the freewheeling clutch 1133 is overrun.

Figure 12:
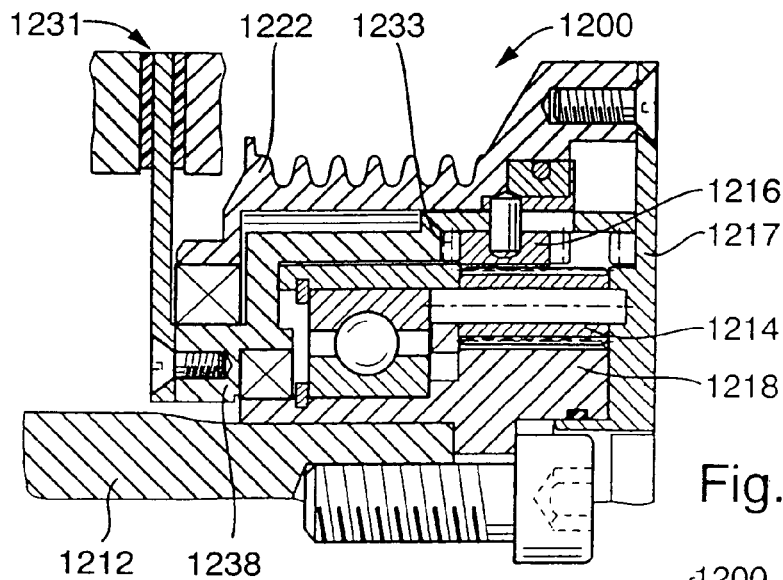
Figure 13:
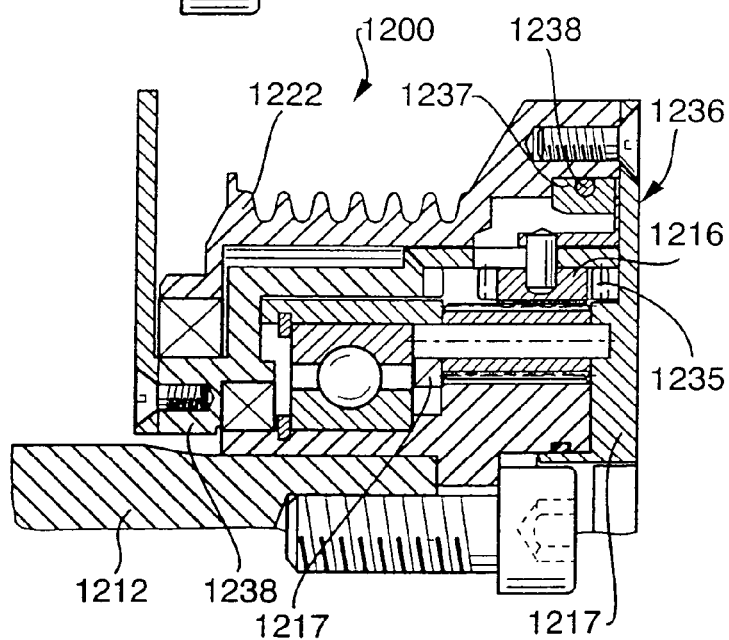

The rotary transfer device 1200 shown in FIG. 12 and FIG. 13 is connected to the rotor shaft 1212 of an electromechanical energy converter in an analogous manner as was described in the context of FIGS. 10 and 11. The belt pulley 1222 is connected to the planet carrier 1217, and the shaft 1212 is connected to the sun gear 1218. The planetary gear mechanism with the planet gears 1214, the planet carrier 1217, the sun gear 1218, and the ring gear 1216 have helical gear profiles. The ring gear 1216 is axially movable and shifts to one side or the other depending on the direction of the torque flow, whereby the transfer ratio is changed dependent on the torque-flow direction.

The ring gear 1216 is movable axially in relation a component 1238 that can be constrained from rotating by a brake 1231 which works in ah analogous manner as the brake 1031.

The angle of the helical tooth profile of the gears 1214, 1216, 1218 is selected so that the axial force components between the teeth will be large enough to move th ring gear 1216 in the axial direction. In the case where the shaft 1212 drives the ring gear 1218 and the crankshaft of the combustion engine is driven by way of the planet carrier 1217, the axial reaction in the helical gear profile will push the ring gear 1216 to the left (in the view of FIG. 12) and hold the ring gear 1216 in compressive contact with the component 1238. The reactive torque is taken up and transmitted by the contact interface through a positive engagement 1233, e.g., axially facing tooth profiles (so-called Hirth profiles), a dog-clutch arrangement, etc., and/or a frictional torque transfer. As the ring gear 1216 is immobilized because in this operating mode the component 1238 is arrested by the brake 1231, the result is an rpm-reduction (with a corresponding torque amplification) of appropriate magnitude to start the engine by way of the belt pulley 1222. If, on the other hand, the belt pulley 1222 with the connected planet carrier 1217 is driven by the crankshaft and, consequently, the shaft 1212 is at the receiving end of the torque flow through the sun gear 1218, the axial force component on the ring gear 1216 will be directed the opposite way. The ring gear 1216 will thereby be pushed to the right into compressive contact with the planet carrier 1217. The connection between the ring gear 1216 and the arrested component 1238 will be interrupted and a different connection will be established by a frictional or form-locking engagement 1235 (see FIG. 13) between the planet carrier 1217 and the ring gear 1216. The planet gears and the planet carrier will thereby be locked to the ring gear, so that the sun gear 1218, the planet carrier 1217, the planet gears 1214 and the ring gear 1216 will turn together with the shaft 1212 as one rigid unit in the generator mode, i.e., with a transfer ratio of 1:1.

The transmission 1200 further has a centrifugal clutch 1236 with centrifugal elements 1237 that are pushed radially inwards by at least one energy-storing device 1237a. The centrifugal clutch 1236 serves to additionally secure the transfer device in the shift position shown in FIG. 13, dependent on the rpm rate of the belt pulley 1222, which is tied to the engine rpm rate.

The transfer device 1200 shown in FIGS. 12 and 13 works in a similar way as the device 409 of FIG. 5, except that the embodiment of FIGS. 12 and 13 does not have a damper or absorber. However, in many applications it can be of practical benefit if the device 1200, too, is equipped with a damper and/or absorber. As a particularly practical configuration in connection with a starter/generator unit that supports or includes a rotary transfer device 1200, the damper and/or absorber may be arranged on the crankshaft of the engine. According to known practice, the damper and/or absorber can be integrated in the pulley on the engine side of the belt drive.

With the designs of transfer devices according to the FIGS. 10 to 13, it is possible to also start combustion engines that require a larger amount of starter torque. With an appropriate design of the rotary transfer device, it is possible to achieve bigger transfer ratios in the belt drive, in the sense of reducing the rpm rate (and amplifying the torque) in the transfer from the electro-mechanical energy converter to the combustion engine, as required for starting the combustion engine. In the generator mode, on the other hand, a suitable transfer ratio requires that the rpm rate be reduced in the opposite direction, for a lower rpm rate of the rotor of the electro-mechanical energy converter. This requirement can likewise be met by the inventive embodiments and arrangements of the rotary transfer device on the electrical starter/generator. The arrangement of the transfer device on the starter/generator unit has the further advantage that it allows the transfer unit to be designed with significantly more compact dimensions.

Figure 14:
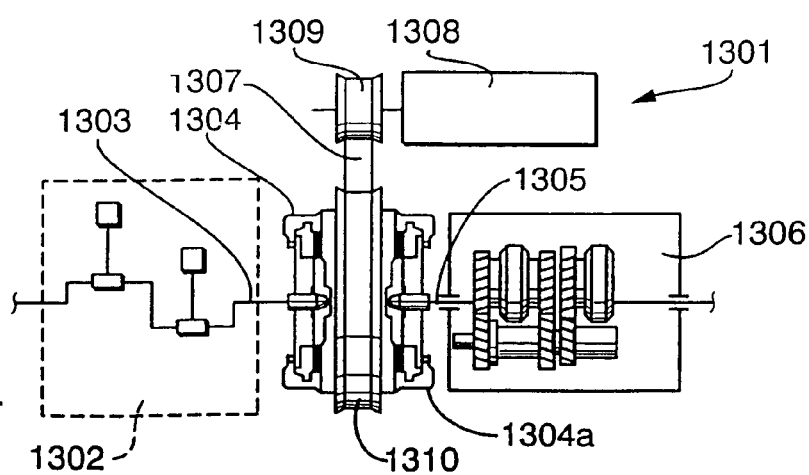

FIG. 14 illustrates a further embodiment of an electrical starter/generator 1308 in a power train 1301. The power train 1301 includes a drive unit 1302, e.g., a combustion engine whose output shaft 1303 can be coupled to a flywheel mass 1310 by means of a clutch 1304. The rotatably supported flywheel mass 1310 can be coupled by way of a second clutch 1304a to the input shaft 1305 of a driven unit 1306, e.g., a transmission. Examples of possible designs of a flywheel mass 1310 and clutches 1304, 1304a may be found, e.g., in the German laid-open applications DE-OS 29 17 138, DE-OS 29 31 513, and DE-OS 27 48 697. The electro-mechanical energy converter 1308 is coupled to the flywheel mass through a belt- or chain drive, or in certain cases by a gear connection. As an advantageous arrangement, the electro-mechanical energy converter 1308 may be connected to a rotary transfer device 1309, where the latter is preferably installed in a coaxial arrangement with the rotor shaft of the electro-mechanical energy converter 1308. The transfer device 1309 may be configured in accordance with one of the embodiments described above, particularly as illustrated in FIGS. 2, 3, 10, 11, 12, and 13.

Figure 15:
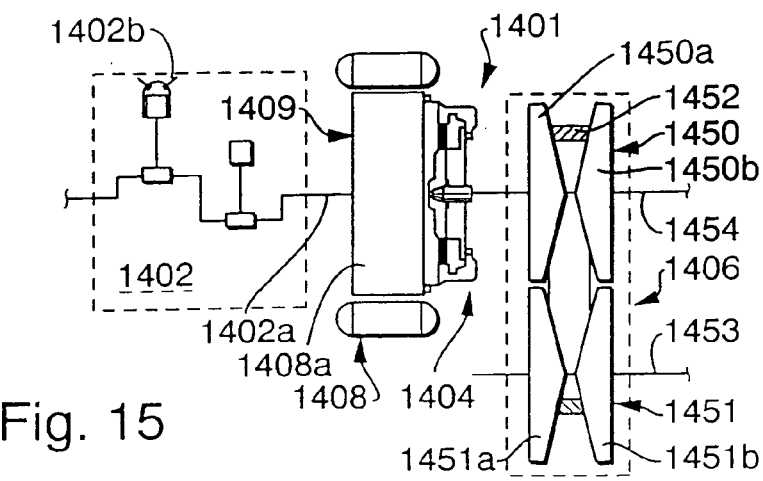

FIG. 15 shows an embodiment of a power train 1401 that is similar to the power train 1" of FIG. 1c. The vehicle transmission 1406 of the power train 1401 is a continuously variable transmission, which allows a step-less variation of the transmission ratio. The variable setting of the transmission 1406 is made in an essentially known manner by means of two cone pulleys 1450, 1451 which are arranged on the transmission input shaft 1454 and the transmission output shaft 1453, respectively. Each cone pulley is made up of a pair of conically tapered discs 1450a, 1450b and 1451a, 1451b, respectively. An endless-loop device 1452 is seated in friction contact axially between the discs 1450a, 1450b and between the discs 1451a, 1451b. The discs of each pair can be moved axially towards and apart from each other by hydraulic, mechanical and/or electrical actuating means, which will cause the endless-loop device to change its position to a larger or smaller running radius, whereby the desired transfer ratio between the combustion engine 1402 and the output shaft 1453 of the transmission 1406 can be set or changed.

The electro-mechanical energy converter 1408 is interposed between the combustion engine 1402 and the transmission 1406, arranged coaxially around the transmission input shaft 1454, which lies in the same axis as the crankshaft 1402a of the combustion engine 1402. A start-up clutch 1404 is arranged to couple and uncouple the shafts 1402a and 1454. As a practical consideration, the start-up clutch 1404 can be arranged in the torque flow path between the electro-mechanical energy converter 1408 and the transmission 1406, either as a dry clutch in a bell housing outside of the transmission 1406, or as a wet clutch inside the transmission housing. The clutch 1404 may be equipped with a torsional vibration damper (not shown in the drawing), or it can be part of a split flywheel, where the rotor 1408a of the electro-mechanical energy converter 1408 may be designed as the primary flywheel mass, and the clutch 1404 may be designed as the secondary flywheel mass, with a damper device arranged in an essentially known manner to oppose relative rotation between the two flywheel masses 1408a and 1404 with a damping force or damping torque.

If necessary, a transfer mechanism 1409 may be interposed in the torque flow between the rotor 1408a and the crankshaft 1402, arranged radially inside the envelope of the rotor and designed to shift automatically into the appropriate transfer ratio dependent on the operating states of the power train 1401.

The operating states include at least a starter mode and a generator mode. In the starter mode, the clutch 1404 is preferably disengaged, and the transfer device 1409 is set to convert the rpm rate of the electro-mechanical energy converter to a lower rpm rate. If the vehicle is in motion and the engine is standing still or has been shut off to save fuel, the engine 1402 can also be started by engaging the clutch in a controlled manner, with or without the assistance of the electro-mechanical energy converter. 1408. In the generator mode, the rpm rate of the electro-mechanical energy converter 1408 is either equal or smaller than the crankshaft rpm rate. Additional possibilities include an operating mode where both power plants, the combustion engine 1402 and the electro-mechanical energy converter 1408, are used to propel the vehicle; and further, an impulse-starter mode and/or an energy-recovery mode. However, the latter modes require the combustion engine to be equipped with electrically controlled, e.g., piezo-electrically actuated engine valves 1402b of a kind that can be controlled independently of the cycle phases of the engine, so that the drag torque caused by the compression of the engine can be at least partially removed. In the impulse-starter mode, the valves 1402b are opened and the combustion engine is accelerated by the electro-mechanical energy converter 1408, whereupon the valves are closed and the engine begins to run. In the energy-recovery mode, the electro-mechanical energy converter 1408 is used to slow down the vehicle through the decelerating torque that is associated with the generation of electrical energy, which is fed into an electrical storage accumulator (not shown). The valves 1402b of the combustion engine are held open to reduce the drag torque of the combustion engine. For a stronger braking effect, the valves may also be closed, particularly if the electro-mechanical energy converter 1408 is working at the limit of its decelerating capability. It is self-evident, that the control- and regulating processes associated with the foregoing operating modes can be performed by a processor unit (not shown in the drawing), and that also the fuel economy in these operating modes can be optimized, e.g., by cutting off the fuel supply to the cylinders that are not performing any work because their valves 1402b are held open during the compression phase of the engine cycle.

Figure 16:
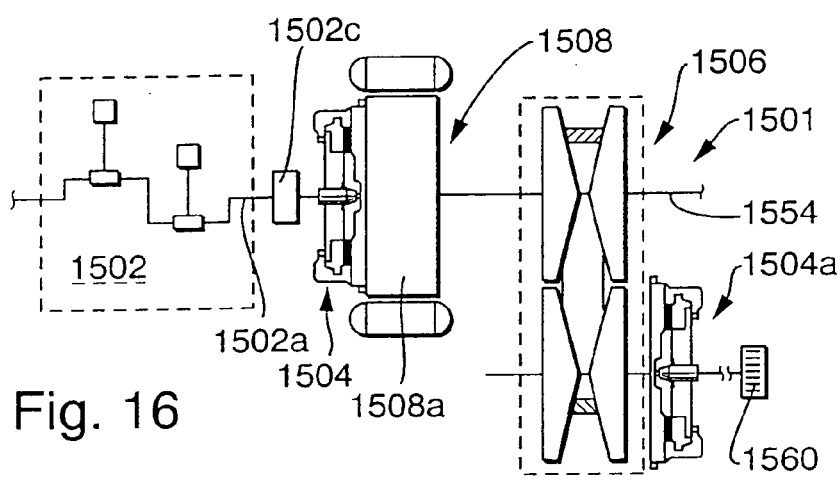
Figure 17:
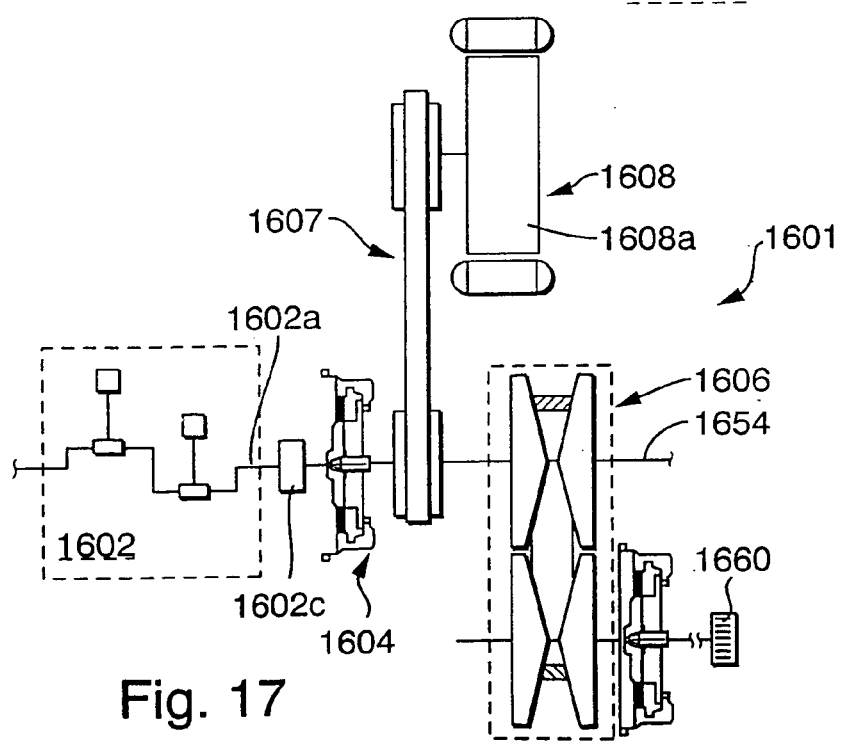

FIGS. 16 and 17 illustrate embodiments of power trains 1501 and 1601 that are analogous to the example 1401 of FIG. 15, except for the differences that the power trains 1501 and 1601 use a different arrangement of the clutch 1504, 1604 and that an additional clutch 1504a, 1604a is arranged in the torque flow between the electro-mechanical energy converter 1508, 1608 and the driven wheels 1560, 1660. The electro-mechanical energy converter 1508 of the power train 1501 is arranged concentrically on the transmission input shaft 1554, while the electro-mechanical energy converter 1608 is arranged parallel to the transmission input shaft 1654 and connected to the latter through a friction-based interactive connection 1607.

The clutch 1504, 1604 is arranged in the torque flow between the engine 1502, 1602 and the electro-mechanical energy converter 1508, 1608, so that the engine 1502, 1602 can be cut off from the rest of the power train. Energy can thus be recovered independently of the drag torque of the combustion engine 1502, 1602. Furthermore, this arrangement allows a direct start of the engine with the clutch 1504, 1604 engaged and the clutch 1504a, 1604a disengaged, as well as an impulse start where both clutches are disengaged. In the impulse-starter mode, the electro-mechanical energy converter 1508, 1608 with the rotor-connected mass 1508a, 1608a is first brought up to speed, whereupon the clutch 1504, 1604 is engaged and the engine 1502, 1602 is started. In order to stabilize the rpm rate of the engine 1502, 1602, particularly when the latter is idling with the clutch 1504, 1604 disengaged, it can be advantageous to arrange an additional flywheel mass 1502c, 1602c on the crankshaft 1502a, 1602a. In some cases it may also be advantageous to turn off the power plant 1502, 1602 when the clutch 1504, 1604 is disengaged, with an automatic restart when the clutch 1504, 1604 is re-engaged. The flywheel mass of the rotor 1508a, 1608a can in addition serve as a mechanical energy storage device during an energy-recovery phase. With a continuously variable transmission 1406, 1506, 1606, as shown in FIGS. 15, 16, 17, respectively, this has the advantage that in the energy-recovery mode, an underdrive ratio can be set in the rotary transfer from the wheels 1560, 1660 to the rotor 1508a, 1608a, so that a high degree of vehicle deceleration is achieved because of the strong acceleration of the rotor, so that the latter can also store mechanical energy in the form of rotational kinetic energy, in addition to generating electrical energy. To subsequently accelerate the vehicle again, the stored kinetic energy can be returned to the wheels by setting the transmission 1406, 1506, 1606 at an appropriate ratio. The mechanical energy recovery has the advantage that no energy is lost to conversion.

It is self-evident that the clutch 1504a, 1604a can also be arranged at a location in the torque flow between the electro-mechanical energy converter 1508, 1608 and the transmission 1506, 1606. The clutches 1504, 1604, 1504a, 1604a may be configured as dry or wet clutches and can be accommodated in the transmission housing or in a bell housing on the transmission 1506, 1606. Furthermore, the continuously variable transmission 1406, 1506, 1606 shown in FIGS. 15–17 can also be replaced by any other type of vehicle transmission such as, e.g., a step-shifting automatic transmission, a manually shifted transmission or the like.

Figure 18:
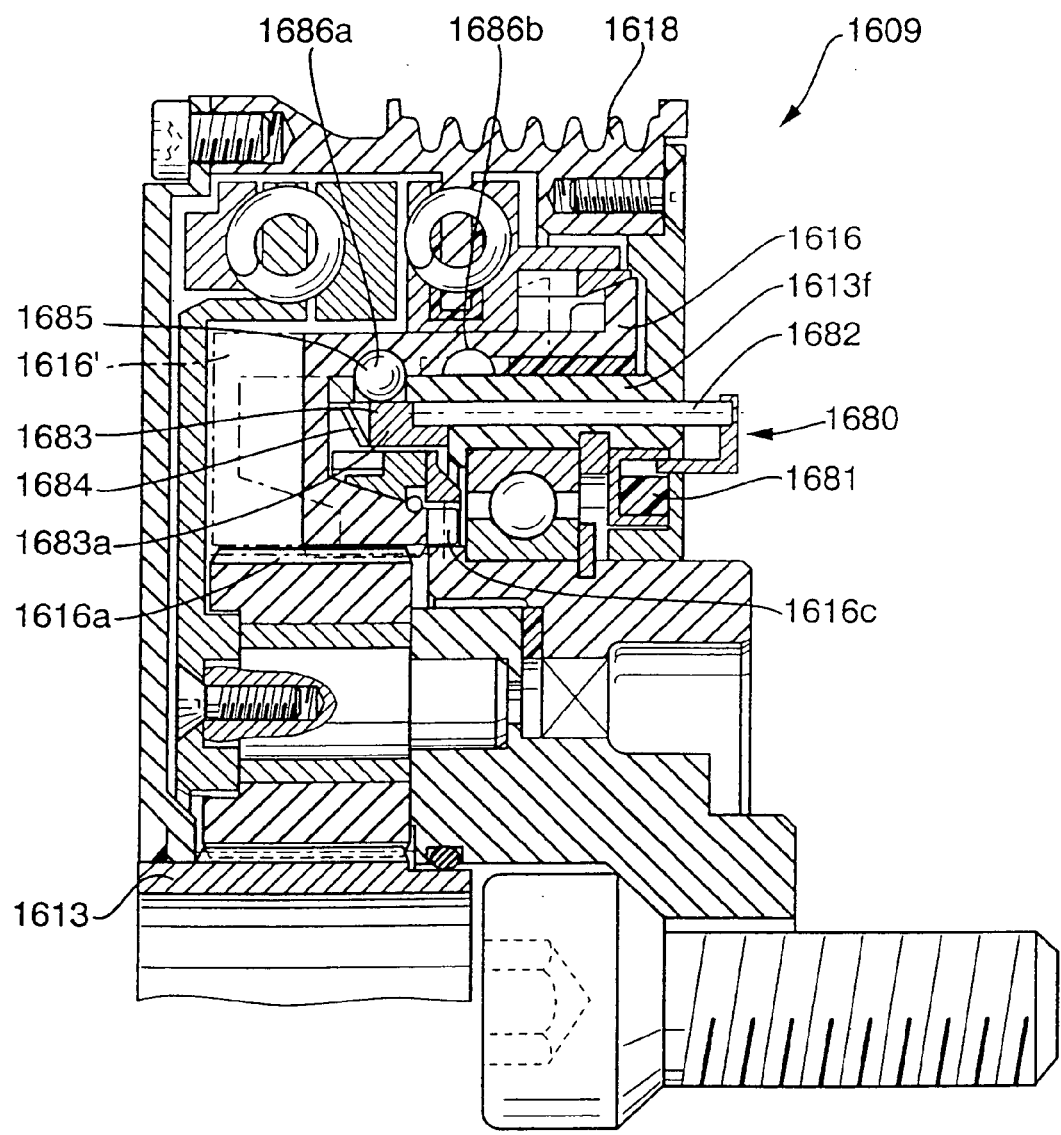
FIG. 18 represents an embodiment with an externally controlled lock-up of the transfer ratios.

FIG. 18 illustrates an embodiment of a rotary transfer device 1609 that is similar to the transfer device 409 of FIG. 5, with one difference: While the device 409 has a centrifugal mechanism to keep the transfer device locked in an rpm-amplifying position when the electro-mechanical energy converter is in a torque-generating mode, e.g., to boost the propulsive power of the engine, the rotary transfer device 1609 of FIG. 18 uses an externally controlled locking device 1680 to lock up either of the two transfer ratios.

The locking device 1680 has an externally controlled electromagnet 1681 and lock units that are distributed along a circle. Each lock unit consists of a push member 1682, a wedge member 1683, and a locking member such as a ball

1685. The electromagnet 1681 exerts an axial force on the wedge members 1683 against the opposition of an axially acting energy-storing device 1684 that is seated at the internal circumference of an axial extension 1613f of the sun gear 1613. The locking balls 1685 serve to lock up the axial position of the ring gear 1616 through a form-locking engagement between the ring gear 1616 and the axial extension 1613f. In the illustrated position of the ring gear 1616, the balls 1685 are seated in the circumferential ring groove 1686a, while in the other of the two operating positions (indicated as 1616' in dash-dotted lines), the balls are seated in the ring groove 1686b. To change the engagement of the balls from one of the ring grooves to the other, the wedge members 1683, which have an appropriate ramp geometry 1683a, are moved out of their locking positions against the spring-bias action of the energy-storing device 1684 by energizing the electromagnet 1681, while the ring gear 1616 is moving axially as a result of the axial force component generated by the helical gears. In their unlocked axial positions, the wedge members 1683 allow the balls 1685 to be pushed radially inwards into the radially ramped recesses 1683a by the profile shape of the groove 1686a or 1686b.

Figure 19:
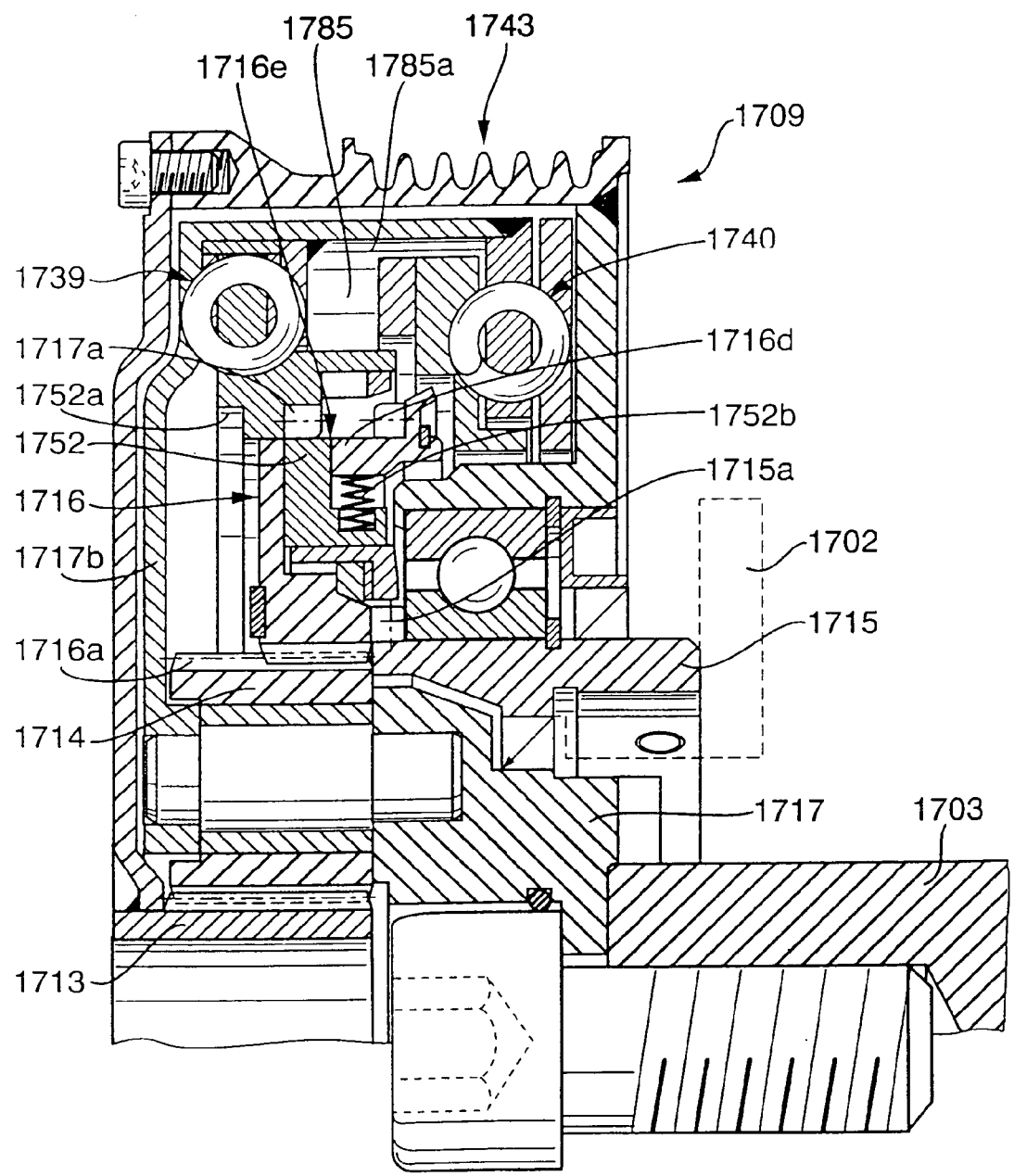
FIG. 19 represents a further embodiment of a rotary transfer device mounted on the output shaft of the combustion engine, with an improved level of efficiency.

The embodiment of a rotary transfer device 1709 in FIG. 19 is similar to the device 409 in FIG. 5 and is optimized with regard to its efficiency by reducing the energy loss that occurs in narrow gaps due to laminar shear in the lubricating grease or oil. The improvement is achieved by optimizing the spatial arrangement and avoiding narrow gaps between components that rotate relative to each other inside the stationary housing 1715 that is attached by means of a holder 1702 to the engine housing (not shown in the drawing). This dictates the choice of a different functional principle in comparison to the transfer device 409 of FIG. 5. The slope angle of the helical tooth profile 1715a between the planet gears 1714 and the ring gear 1716 is reversed, so that the ring gear is pushed axially towards the holder 1702 and coupled to the housing 1715 through a form-locking profile engagement 1716c for the shift to an rpm-reducing transfer ratio. The torque received from the electro-mechanical energy converter through the belt pulley 1743 is transmitted through the sun gear (which is connected to the belt pulley 1743) through the planetary gears 1714 to the planet carrier 1717 which, in turn, is connected to the output shaft of the combustion engine. This operating mode of the transfer device is used, e.g., to start the engine.

When a torque is transmitted in the opposite direction through the transfer device 1709, the helical gear profile 1716a will push the ring gear 1716 in the direction pointing away from the holder 1702, whereby the form-locking engagement of the ring gear 1716 to the housing 1715 is released, while the ring gear becomes connected to the planet carrier 1717 through a profile engagement 1717a and the radially directed flange 1717b. The latter carries an axial extension 1717c along its outside circumference. A damper 1739 is arranged in the transition area between the radial flange 1717b and its axial extension 1717c, and a vibration/shock absorber 1740 is mounted at the internal circumference near the free end of the axial extension 1717c. In contrast to the embodiment of FIG. 5, where the damper is arranged in the torque-flow path between the planet gears and the driving shaft, the damper 1739 of FIG. 19 is arranged between the planet carrier 1717 and the ring gear 1716 and is only active when the transfer device is operating in the direct mode. Thus, the damper 1739 is uncoupled from the extreme jolts and oscillations during the start of the engine and can therefore be of a less robust design.

To lock the ring gear 1716 in the direct-transfer position, the transfer device 1709 has centrifugal elements 1752 that are distributed over a circle and pass through openings 1716e of an axial extension 1716d of the ring gear, driven outwards by the centrifugal force and opposed by the energy-storing devices 1752b, to engage a matching arrangement of shoulders 1752a of the damper 1739. Thus, if the torque flow is reversed at a high rpm-rate, e.g., when switching from a generator mode to a booster mode, the ring gear remains locked in the direct transfer ratio of the generator mode. If the rpm-rate is subsequently lowered, the radially acting energy-storing devices 1752b will retract the centrifugal elements 1752 and thus release the lock on the ring gear 1716.

With this arrangement, the rotary transfer device is essentially free of narrow gaps between rotating and stationary components and border surfaces, so that less energy will be used up by shear friction in the lubricant 1785a in the space 1785 and, consequently, the efficiency of the transfer device 1709 will be increased.

Figure 20:
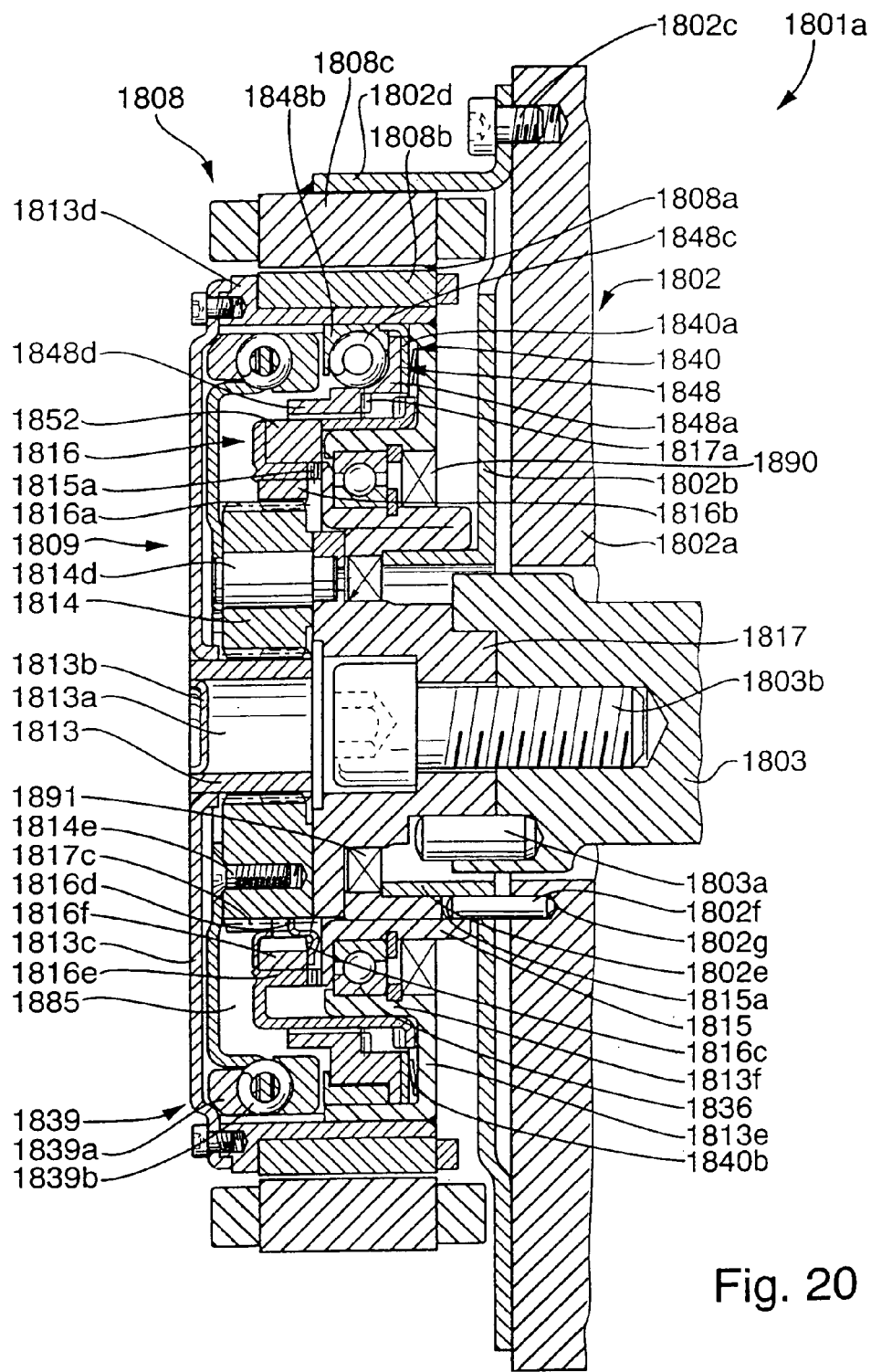
FIG. 20 represents an embodiment with an electro-mechanical energy converter concentrically surrounding the output shaft of the combustion engine.

FIG. 20 represents a portion of a power train where the transfer device 1809 is arranged radially inside the electromechanical energy converter 1808, directly on the driving shaft, such as the crankshaft 1803 of the combustion engine 1802, of which only a wall section is indicated in the drawing. The transfer device 1809 is arranged at the end of the crankshaft that faces in the opposite direction from the transmission, i.e., the side that normally carries the belt drive for the auxiliary devices such as the power-steering pump, air conditioner. These devices as well as the valve-actuating mechanism can be driven in some other way, for example electrically.

The starter/generator unit 1801a consisting of the electro-mechanical energy converter 1808 and the rotary transfer device 1809 is mounted on the housing 1802a of the engine 1802 as a completely preassembled unit. Thus, the electromechanical energy converter can be preassembled with the gap 1808a between the rotor 1808b and the stator, 1808c already adjusted. The installation adapter 1802b, mounted on the engine housing 1802a by means of fasteners 1802c, holds the housing 1815 and the stator 1808c in position relative to each other. The planet carrier 1817—which represents the input side of the transfer device 1809 from the direction of the engine 1802—is centered and rotationally constrained on the driving shaft 1803 by a form-locking axial profile, in this case represented by at least one axial pin 1803a, and axially secured to the driving shaft 1803 by a central screw bolt 1803 that is recessed in a central hole 1813a of the sun gear 1813 which provides access for the installation tool and can be covered by a cap 1813b.

The installation adapter 1802b in the illustrated example is designed as a sheet-metal stamping which has prongs 1802d distributed over its outside circumference that are bent to stand out in the axial direction to hold the stator 1808c. The latter is immovably connected to the prongs 1802d, e.g., by screws, rivets, or by welding. An axial extension 1802e at the inner circumference of the sheet-metal stamping 1802b serves as a seat for the housing 1815. Axially oriented bolts 1802f outside the circumference of the axial extension 1802e constrain the housing 1815 of the transfer device 1809 from rotating against the housing 1802a of the combustion engine 1802 by engaging suitably arranged openings 1815b, 1802g. The sheet-metal stamping 1802b is axially secured on the housing 1802a of the combustion engine 1802 by means of fasteners 1802c that are distributed along an outer circumference, such as screws or hollow rivets.

The rotary transfer device 1809, which is arranged radially inside the rotor of the electro-mechanical energy converter 1808, works in an analogous manner as the embodiments 409, 1609 and 1709 of FIGS. 5, 18 and 19. A ring gear 1816 is pushed axially to one side or the other by the interaction of its helical tooth profile 1816a with the helical planet gears 1814, depending on the direction of the torque flow. The shift between the two transfer ratios occurs through the respective engagement of either the tooth profile 1815a or the profile 1817a. When the tooth profile 1815a is engaged, the ring gear 1816 is rotationally constrained to the housing 1815. Thus, a torque introduced from the rotor 1808b by way of the flange part 1813c into the sun gear 1813 is transmitted through the planetary gear set 1814 into the planet carrier 1817 which, in turn, starts the engine 1802 by turning the output shaft 1803 at an rpm-reducing gear ratio.

When the direction of the torque flow reverses itself, e.g., after the engine 1802 has been started and as the electro-mechanical energy converter is changing into the generator mode, the axial reactive force in the helical tooth profile 1816a is likewise reversed, so that the ring gear 1816 is moved in the axial direction where the tooth profile 1815a is disengaged from the housing 1815 and the tooth profile 1817a becomes engaged to the input part 1848a of the torsional vibration damper 1848. The latter has an output part 1848b in rotationally fixed connection with the rotor 1808b and the sun gear 1813. The input part 1848a and the output part 1848b are rotatable relative to each other against the opposition of energy-storing devices 1848c that are distributed along a circumference, so that the rotor 1808b is connected directly through the sun gear 1813 by way of the damper 1848 to the planet carrier 1817 and thus to the engine shaft 1803, with a 1:1 gear ratio of the rotary transfer device.

Figure 21:
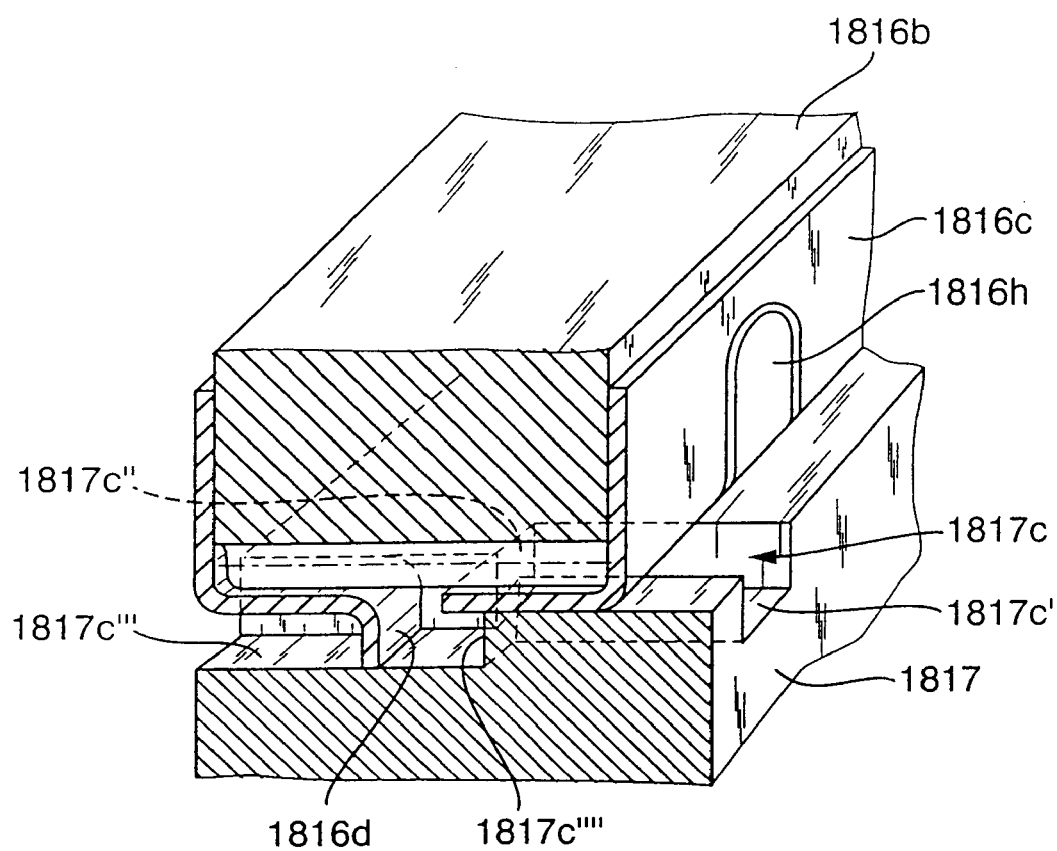
FIG. 21 represents a detail of the arrangement shown in FIG. 20.

To facilitate the shift between the transfer ratios, the relative rotation between the ring gear 1816 and the planet carrier 1817 is restrained by a braking device, analogous to the other rotary transfer devices with an axially movable ring gear, i.e., 409, 1609 and 1709. Thus, the ring gear 1816 is prevented from spinning in mesh with the planetary gears 1814 without the ring gear 1816 being moved axially. In the illustrated embodiment, the tooth-profiled ring 1816b of the ring gear 1816 is axially biased by spring segments 1816c. A preferred arrangement has three spring segments 1816c distributed along a circumference. The spring segments 1816c have inward-directed radial prongs 1816d engaged in openings 1817c of the planet carrier 1817. If the ring gear 1816 is turning in relation to the planet carrier 1817, the spring segments will produce a frictional torque between the ring gear and the planet carrier and thereby increase the axial force component between them. The spring segments 1816c in combination with the openings 1817c further serve as a synchronizer for the tooth profile 1817a. This function is illustrated in detail in FIG. 21 which shows a cut-off portion of the tooth-profile ring 1816b of the ring gear 1816 (of FIG. 20). The spring bracket 1816c is arranged at the inside circumference and embracing the sides of the tooth-profile ring 1816b, with the spring-biased prongs 1816h creating a frictional contact. The inwards directed prong 1816d engages the cutout 1817c on the outside circumference of the planet carrier 1817. The cutout 1817c is designed so that the prong 1816d and thus the tooth-profile ring 1816b with the ring gear 1816 can slide in a first section 1817c' up to a stop 1817''. This occurs with the axial displacement of the ring gear 1816 at the change from the rpm-reducing ratio to the direct 1:1 ratio, where the form-locking connection between the housing 1815 and the ring gear 1816 is disengaged. The stop 1817'' prevents the ring gear 1816 from moving further in the axial direction, so that the form-locking connection through the tooth profile 1817a between the ring gear 1816 and the input part 1848a of the damper (See FIG. 20) cannot become engaged until the rpm-differential between the gear ring 1816a and the planet carrier 1817 is almost zero. As the planet carrier 1817 is turning still slightly faster, the prong 1816d moves over in the circumferential direction into the second section 1817''' of the cutout 1817c. The axial force component of the helical gear profile 1816a will now displace the helical gear 1816 further until a synchronized engagement between the ring gear 1816 and the damper input part 1848a occurs through the tooth profile 1817a. When the torque flow is reversed again, the prong 1816d will travel in the reverse direction through the cutout 1817c. However, the return of the prong 1816d through the cutout 1817c is of no consequence for the relative rotation between the parts 1816 and 1848a, because no synchronization is required in this case. The engagement of the tooth profile 1815a could likewise be assisted by a synchronization, but this is not implemented in the embodiment of FIG. 20, because the transfer device 1809 is normally shifted into the rpm-reducing mode at a very slow rpm rate.

The direct transfer mode in the embodiment of FIG. 20 is locked preferably by means of three mass segments 1852 that are set into the ring gear 1816 and are driven radially outwards against a stop (not shown) by the centrifugal force to axially lock the ring gear against an axial extension 1848d of the damper 1848 when the tooth profile 1817a is engaged. Thus, the ring gear will remain in the direct ratio mode even with a change in the torque-flow direction, until the rpm-rate decreases enough for the mass segments 1852 to be driven back to their rest positions by energy-storing devices that are not shown here but are analogous to the devices 1752b of FIG. 19. This releases the ring gear 1816 from its axial lock, so that the rpm-reducing mode can be engaged. Of course, the axial lock could also be realized with other mechanisms such as, e.g., the locking device 1680 of FIG. 18.

The individual components of the starter/generator unit 1801a are arranged and shaped essentially as shown in FIG. 20. The diameter is determined essentially by the dimensions required for the electro-mechanical energy converter according to the given power specifications. The rotary transfer device 1809 is arranged as a planetary gear device radially inside the rotor 1808b, but it could also be configured as a stationary gear box or a friction-wheel device. In either case, the shifting between the different ratios could be handled electromagnetically or through one or more electric motors, as well as by hydraulic, pneumatic, or other means. The shift could also be externally actuated, e.g., by means of clutches and/or brakes, including freewheeling devices (also known as overrunning clutches).

In the foregoing embodiment, the planetary gear set 1809 is employed in a manner where the planet carrier 1817 is connected to the driving shaft, normally the crankshaft 1803 of a combustion engine, and the sun gear 1813 is fixed to the rotor 1808b, while the ring gear 1816 is engaged in one operating mode to the housing 1815 and in the other operating mode to the sun gear 1813 by way of the interposed damper 1848. It is self-evident that the planetary gear device can also be used in other variations to obtain at least two rotary transfer ratios between the driving shaft 1803 and the rotor 1808b. The planet carrier 1817 in the illustrated example is configured as a hub with several radial steps. At an axial location between the seat on the driving shaft 1803 and the planetary gear set 1814, the housing is mounted by means of a bearing 1836, which may also be configured as a double bearing to keep the housing 1815 from tumbling on the planet carrier 1817. The planetary gear set has preferably three planet gears that are mounted near the outside diameter of the planet carrier 1817. The housing 1815 in the illustrated example serves more as a stationary support rather than an enclosure, because the space filled by the rotary transfer device 1809 is essentially closed off to the outside by the flange part 1813c that is connected to the sun gear, by the axially oriented rotor carrier 1813d that is bolted together at one end with the flange part 1813c, and by the L-shaped flange part 1813e that is connected to the other end of the rotor carrier 1813d, e.g., by welding. The axial leg 1813f of the L-shaped flange part 1813e is seated on the support 1815. The aforementioned parts enclose a chamber 1885 that is at least partially filled with a lubricant. The chamber 1885 is further closed off with a seal 1890 interposed radially between the flange part 1813e and the support 1815, and by a seal 1891 between the planet carrier 1817 and the support 1815.

The support 1815 as well as the ring gear base 1816 are designed preferably as sheet-metal stampings, in which case the ring gear base 1816 has an internal seating surface 1816e for the helically profiled gear ring 1816f. The latter is force-fitted into the ring-gear base 1816, e.g., wedged into position.

The devices 1848, 1839 for attenuating torsional vibrations are arranged essentially at the outer circumference of the rotary transfer device 1809, immediately adjacent to the inside of the rotor 1808b. The absorber 1839 has an absorber mass 1839a connected through circumferentially acting energy-storing devices 1839b to a flange part 1839c which, in turn, is connected to the planet carrier 1817 by the bolts 1814e alternating with the planet-gear axles 1814d along the circumference of the planet carrier. Thus, the absorber 1839 is effective over the entire working range of the rotary transfer device 1809 in both transfer ratios. In another embodiment, which will not be described in detail herein, the vibration/shock absorber could also be arranged at the opposite end of the driving shaft 1803.

The damper 1848 is active only with the direct (1:1) transfer mode, when the tooth profile 1817a is engaged. The damper 1848 uses a friction device 1840 that is operative between the input part 1848a and the flange part 1813c that is connected to the sun gear 1813. The friction device 1840 has a friction disc 1840a that is pressed against the flange part 1813c by a pre-tensioned axially acting energy-storing device 1840b. The damper 1848 can be designed for a dual-mass flywheel effect with the inertial mass of the rotor 1808b and an additional mass arranged in the torque flow after the energy-storing devices 1848c, e.g., at the other end of the driving shaft 1803. The dual-mass arrangement lowers the resonant rpm-rate to a level below the engine-start rpm rate. This is particularly effective in damping the torsional vibrations that are introduced into the power train primarily from the engine 1802.

The flywheel masses can be optimized for the aforementioned resonance effect and also with a view to minimizing the overall flywheel mass, taking into account that the rotor mass represents part of the engine flywheel mass. Accordingly, the flywheel on the transmission side can be designed smaller, which saves space in this part of the power plant layout. For example, with a gear-shifting transmission, the flywheel mass may consist only of the pressure plate of the clutch, so that space is saved for other systems such as automatic actuators for the clutch or transmission. It may further be advantageous to use the electro-mechanical energy converter 1808 as an "electrical flywheel", where the electro-mechanical energy converter 1808 works in parallel with the engine 1802 at low rpm rates and is equipped with a suitable control to actively compensate the torsional vibrations.

Figure 22:
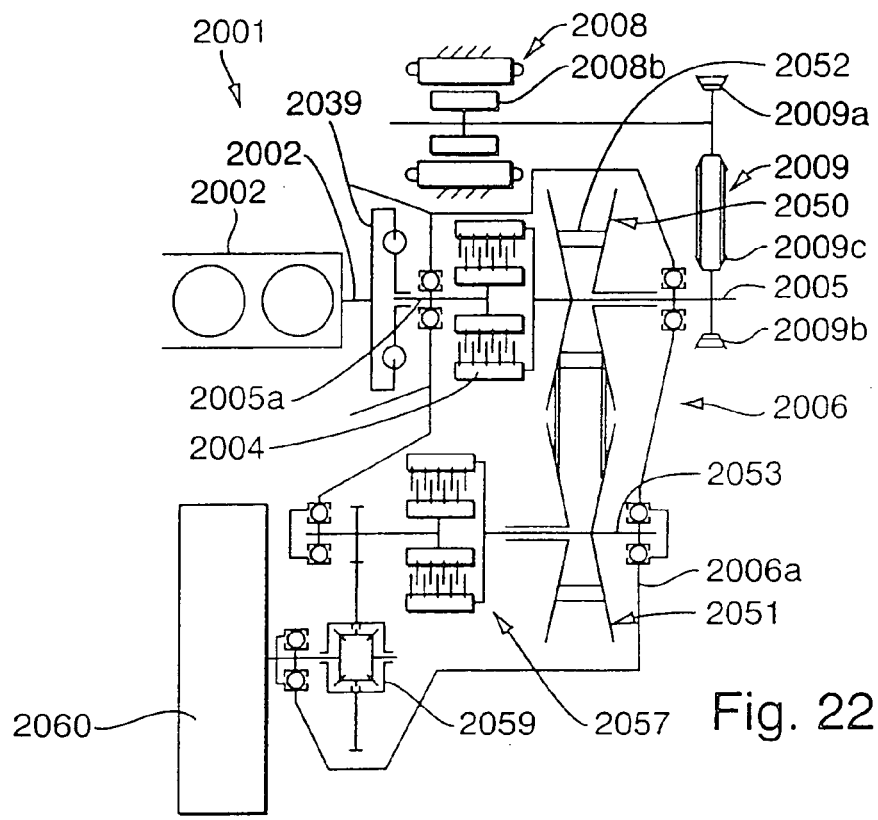
FIGS. 22 and 23 represent embodiments of an electro-mechanical energy converter that is integrated in a vehicle transmission.

FIG. 22 represents a schematic view of an embodiment of a power train 2001 with a combustion engine 2002, where the transmission 2006 is a continuously variable transmission and an electro-mechanical energy converter 2008 is integrated into the torque flow of the transmission. The electro-mechanical energy converter 2008 can be arranged either inside the transmission 2006 or outside of the transmission housing 2006a. The torque-transfer arrangement 2009 may be configured with a belt or a gear set, or by mounting the rotor 2008b directly on the primary shaft 2005 of the transmission. The torque-transfer connection 2009 can be a self-shifting rotary transfer device or a fixed-ratio arrangement.

In the illustrated example, the combustion engine 2002 is connected to the transmission input shaft 2005a through a torsional vibration damper 2039. The transmission input shaft 2005a can be coupled to the primary transmission shaft 2005 by means of a clutch 2004. The primary set of conical discs 2050 of the cone-pulley transmission 2006 is rotationally tied to the primary transmission shaft 2005. An endless-loop device 2052 such as a chain or belt transmits torque from the primary disc set 2050 to the secondary disc set 2051, the latter being rotationally coupled to the secondary transmission shaft 2053. The operating principle of a continuously variable transmission is known per se and is described in detail for example in DE 195 44 644. A second clutch 2057 serves to uncouple the secondary transmission shaft 2053 from the differential 2059 and the driven wheels 2060. The clutches 2004, 2057 can be friction clutches, preferably of a laminar-disc design and running in an oil bath. The power train 2001 further contains a direction-reversing device, which is not shown in FIG. 22.

In the power train 2001 of FIG. 22, the electro-mechanical energy converter 2008 is arranged in relation to the combustion engine 2002 at the opposite end of the primary transmission shaft 2005. This configuration is particularly advantageous for front-wheel drive arrangements with the combustion engine 2002 installed in the front part of the vehicle with either transverse or lengthwise orientation without a drive shaft to the rear wheels. The primary transmission shaft 2005 can extend to the outside of the transmission housing 2006a, sealed by a shaft seal ring. The electro-mechanical energy converter can in this case be mounted coaxially on the primary transmission shaft 2005, with the stator being non-rotatably connected to the housing 2006a and the rotor being rotationally coupled to the primary transmission shaft 2005. As an alternative, the electro-mechanical energy converter 2008 may be arranged as illustrated in FIG. 22, i.e., on a parallel shaft that is coupled to the primary transmission shaft 2005 by way of an interposed rotary transfer device such as a spur-gear set or a belt drive 2009 with adjustable cone pulleys 2009a, 2009b that hold the belt or chain at a variably selectable radius, so that the transfer ratio can be adjusted either by means of an external control or through a self-adjusting arrangement based, e.g., on a centrifugal principle. Using a rotary transfer device 2009 allows the rpm rate of the electro-mechanical energy converter 2008 to be optimized for the rpm range of the primary transmission shaft 2005. The rotary transfer device 2009 could also be accommodated radially inside the rotor, interposed between the latter and the primary transmission shaft 2005 in a coaxial arrangement of the electromechanical energy converter 2008. The latter, more compact design configuration has the potential advantage of a cost- and weight reduction.

Figure 23:
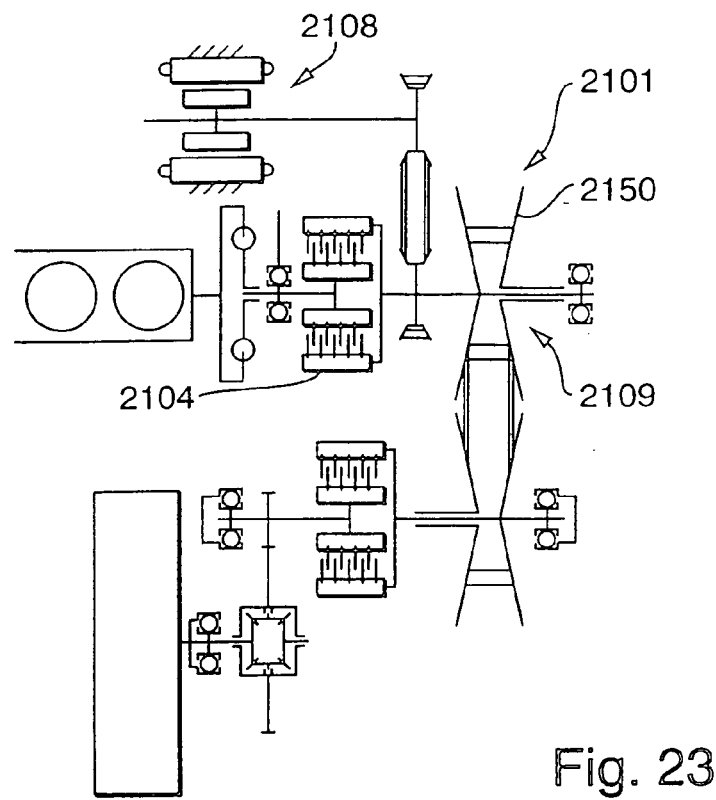

FIG. 23 gives a schematic view of an embodiment of a power train 2101 that is substantially identical to the power train 2001 of FIG. 22, except for the differences that will now be described.

The electro-mechanical energy converter 2108 arranged at a point in the torque flow between the clutch 2104 and the disc set 2150, either coaxial with the latter or, as illustrated, on a parallel shaft. With the parallel arrangement, the electro-mechanical energy converter 2108 can be either inside or outside of the transmission housing (not shown). If arranged inside the transmission 2109, the electro-mechanical energy converter 2108 can be encapsulated against the transmission fluid. It should be considered self-evident that an encapsulation can have advantages for any arrangement where one of the inventive electro-mechanical energy converters and rotary transfer devices is integrated in a transmission. The electric leads to the electro-mechanical energy converter can be included in a cable tree for the control of the transmission 2109. A common interface connection, e.g., a common plug for the connection to the transmission components and to the electro-mechanical energy converter, can be an advantageous design detail.

Figure 24A:
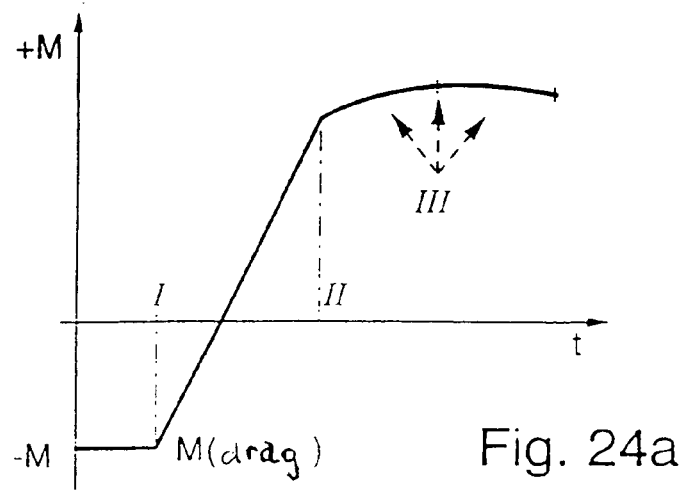
FIGS. 24a–c represent methods of controlling an electro-mechanical energy converter while the latter is working in an energy-recovering mode.
Figure 24B:
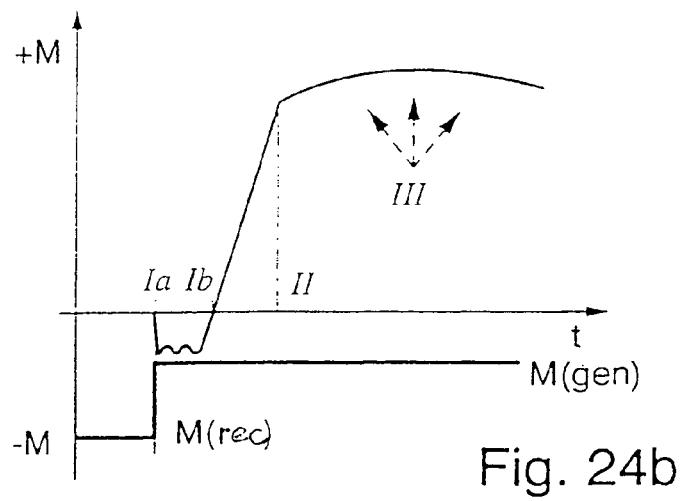
Figure 24C:
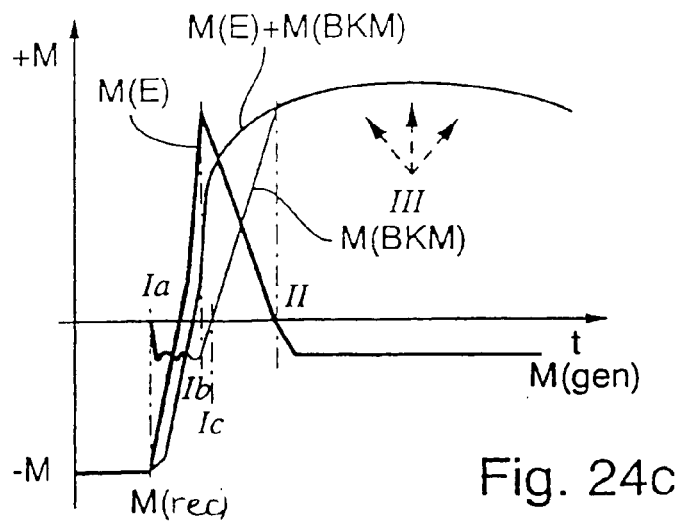

The FIGS. 24a to 24c represent time graphs to compare three different possibilities of a transition from a drag mode (where the vehicle is decelerated by the engine) to a traction mode (where the vehicle is accelerated).

FIG. 24a illustrates the time profile of the torque M for a vehicle without energy recovery, where the combustion engine decelerates the vehicle through the drag torque M(drag) This is also referred to as an engine brake. At point I, the driver initiates a request to the engine to supply power, e.g., by depressing the gas pedal. The engine changes substantially jolt-free into the traction mode until the rpm rate has been raised to a level where after point II, the vehicle can be moved at the full-load torque level III.

FIG. 24b illustrates the transition from a drag mode to a traction mode in a vehicle that uses a state-of-the-art energy recovery method. The torque M as a function of the time t is in an initial phase represented by the recovery-brake torque M(rec) that is introduced into the power train by the electro-mechanical energy converter. The combustion engine is in this case turned off in order to save fuel. When the driver requests engine power, the engine is started up at point Ia. The engine is started by using the remaining kinetic energy of the vehicle, while the electro-mechanical energy converter continues to work in the generator mode, using a portion M(gen) of the torque. The engine start creates a jolt in the vehicle during the time interval between Ia and Ib, i.e., the vehicle is at first slowed down instead of accelerated, and there is no instantaneous increase of the torque until the engine has been started at point Ib and is building up torque up to point II, where the engine has attained the full-load range III. In comparison to the smooth torque profile of FIG. 24a, many drivers find the jolt at the restart of the engine uncomfortable and unacceptable with regard to safety.

FIG. 24c illustrates how the electro-mechanical energy converter can be controlled in a manner that avoids the foregoing problem. At the outset, the vehicle is again in an energy-recovery mode where the electro-mechanical energy converter decelerates the car with a torque M(rec) and thereby produces electricity. When the driver requests power at point Ia, the electro-mechanical energy converter is switched immediately into a traction mode and injects a torque M(E) into the power train to propel the vehicle until the combustion engine has been started. The engine start takes place between the points Ia and Ib. If the car has no start-up clutch, or if the clutch is left engaged, the kinetic energy of the car and the torque M(E) of the electro-mechanical energy converter can work together to start the engine. If the car does have a start-up clutch, the latter can be disengaged or run with slippage for a short time to avoid a jolt, while the electro-mechanical energy converter alone is used to start the engine. According to the illustrated embodiment of FIG. 24c, the electro-mechanical energy converter builds up the torque M(E) immediately after the driver's request for power, providing traction and starting the engine at the same time. At point Ib, the combustion engine has been started up and builds up the engine torque M(eng) by increasing the engine rpm rate until the full-load range III has been reached at point II.

The electro-mechanical energy converter is controlled in such a manner that the sum of the torques M(E) and M(eng) in the time interval from the driver's request for power until the full-load phase III has been attained at point II produces a soft transition, e.g., without large time gradients in vehicle speed and/or without gradient reversals. This is achieved by turning up the electro-mechanical energy converter at least to its nominal torque level or momentarily above the nominal torque level when the request for power begins and preferably up to a point Ic which may be before the start of the combustion engine. Subsequently, the torque M(E) is decreased so that the zero cross-over into the generator mode occurs not before the point II where the combustion engine has reached its full-load range III. Obviously, the electro-mechanical energy converter could also be used only to overcome the start-up compression of the combustion engine without supplying an additional amount of torque to the driven wheels of the car. The electro-mechanical energy converter can work as a motor and introduce an accelerating torque into the power train, or it can work as a generator and introduce a decelerating torque, depending on the transmission ratio and engine rpm rate.

The following German patent applications in their entirety are incorporated herein by reference: DE 198 12 417, DE 198 38 036, DE 198 33 784, DE 199 25 332, and DE 199 18 787.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A power train for a motor vehicle, said power train comprising a combustion engine with a driving shaft turning at a first rpm rate, at least one torque-coupling device, a transmission with a transmission input shaft, and an electro-mechanical energy converter with a stator and with a rotor and an energy-converter shaft turning at a second rpm rate, said electro-mechanical energy converter being operable as a motor and as a generator and having an interactive rotary connection to the driving shaft; wherein the electromechanical energy converter is operable in a first mode in which the torque flows from the electro-mechanical energy converter to the combustion engine, and a second mode in which the torque flows from the combustion engine to the electro-mechanical energy converter; wherein the interactive rotary connection automatically sets itself to one of at least two rpm ratios depending on whether the electro-mechanical energy converter is working in the first or second mode, said rpm ratios being defined as quotients of the first rpm rate divided by the second rpm rate; wherein the interactive rotary connection comprises at least one rotary transfer device arranged between the electro-mechanical energy converter and the combustion engine; and wherein the at least one rotary transfer device comprises a planetary gear mechanism with at least one ring gear, at least one sun gear, and at least one planet carrier with at least one planet gear, the transfer device being configured such that that depending upon a sense of rotation thereof and absent activation of an actuator, the transfer device causes the planetary gear mechanism to lockingly engage a non-rotating component in the first mode and under the second mode causes components of the planetary gear mechanism to lockingly engage one another.

2. The power train of claim 1, wherein the driving shaft has a front end facing away from the transmission and the interactive rotary connection is arranged at said front end.

3. The power train of claim 1, wherein the interactive rotary connection comprises at least a pair of sheaves and an endless-loop device coupling the sheaves to each other by frictional contact.

4. The power train of claim 3, wherein each sheave comprises a belt-drive pulley and the endless-loop device comprises a belt.

5. The power train of claim 3, wherein at least one of a rotary vibration damping device and a rotary shock/vibration absorbing device is arranged radially inside one of a belt-drive pulley and the rotor.

6. The power train of claim 1, wherein the electro-mechanical energy converter serves as a starter motor for the combustion engine.

7. The power train of claim 1, wherein the electro-mechanical energy converter is used to propel the motor vehicle.

8. The power train of claim 1, wherein during a start-up phase of the combustion engine the second rpm rate is higher than the first rpm rate.

9. The power train of claim 1, wherein the rpm ratio for the first mode is smaller than the rpm ratio for the second mode.

10. The power train of claim 1, wherein the rotary transfer device comprises a housing and the at least one ring gear is connected and thereby rotationally coupled to the housing.

11. The power train of claim 1, wherein the at least one rotary transfer device further comprises a first clutch located in a first torque flow path that is operative under the first mode, and a second clutch located in a second torque flow path that is operative under the second mode, and wherein the first clutch is engaged in the first mode and disengaged in the second mode, while the second clutch is engaged in the second mode and disengaged in the first mode.

12. The power train of claim 11, wherein under the first mode the electro-mechanical energy converter drives the sun gear which, in turn, drives the planet carrier through the at least one planet gear, and the planet carrier drives the combustion engine; and wherein under the second mode, the combustion engine drives the planet carrier with the at least one planet gear which, in turn, drives the electro-mechanical energy converter through the sun gear.

13. The power train of claim 11, wherein under the first mode the electro-mechanical energy converter drives the combustion engine through the first clutch and a first gear pair selected from the least one ring gear, the at least one sun gear, and the at least one planet carrier with the at least one planet gear; and wherein under the second mode, the combustion engine drives the electro-mechanical energy converter through the second clutch and a second gear pair selected from the least one ring gear, the at least one sun gear, and the at least one planet carrier with the at least one planet gear.

14. The power train of claim 11, wherein the rotary transfer device has first transfer elements that determine the first rpm ratio and wherein the first clutch is placed in the torque flow path at one of an upstream location and a downstream location relative to the first transfer elements.

15. The power train of claim 11, wherein the rotary transfer device has second transfer elements that determine the second rpm ratio and wherein the second clutch is placed in the torque flow path at one of an upstream location and a downstream location relative to the second transfer elements.

16. The power train of claim 1, wherein the interactive rotary connection comprises a rotary vibration damping device with energy-storing elements allowing the driving shaft and the energy converter shaft to rotate in relation to each other within a limited range against an opposing torque of the energy-storing elements.

17. The power train of claim 1, wherein the interactive rotary connection comprises a rotary shock/vibration absorbing device.

18. The power train of claim 1, wherein at least one of a rotary vibration damping device and a rotary shock/vibration absorbing device is arranged on one of the driving shaft and the energy-converter shaft.

19. The power train of claim 1, wherein the ring gear, the planet gears, and the sun gear comprise a helical tooth profile; wherein under the first mode, the helical tooth profile pushes the ring gear in a first axial direction where the ring gear becomes locked to a non-rotating component; and wherein under the second mode, the helical tooth profile pushes the ring gear in a second axial direction where the ring gear becomes locked to the planet carrier.

20. The power train of claim 19, wherein the first mode is a start-up mode, wherein a first rpm ratio of the at least two rpm ratios is normally reserved for the start-up mode, and wherein the rotary transfer device has a ratio-locking means which, at rpm rates exceeding those required for the start-up mode, prevents the rotary transfer device from shifting out of the first rpm ratio.

21. The power train of claim 19, wherein the ratio-locking means comprises at least one centrifugal body arranged at an external circumference of the planet carrier, and wherein a centrifugal force drives the centrifugal body into form-locking engagement with a recess at an internal circumference of the ring gear.

22. The power train of claim 21, the at least one centrifugal body has a spherical shape.

23. The power train of claim 19, wherein the ring gear has axially engaging coupler means for coupling the ring gear to one of the non-rotating component and the planet carrier.

24. The power train of claim 23, wherein the coupler means comprise at least one of a Hirth coupler, a dog clutch, and a friction clutch.

25. A power train for a motor vehicle, said power train comprising a combustion engine with a driving shaft turning at a first rpm rate, at least one torque-coupling device, a transmission with a transmission input shaft, and an electro-mechanical energy converter with a stator and with a rotor and an energy-converter shaft turning at a second rpm rate, said electro-mechanical energy converter being operable as a motor and as a generator and having an interactive rotary connection to the driving shaft; wherein the electromechanical energy converter is operable in a first mode in which the torque flows from the electro-mechanical energy converter to the combustion engine, and a second mode in which the torque flows from the combustion engine to the electro-mechanical energy converter; wherein the interactive rotary connection automatically sets itself to one of at least two rpm ratios depending on whether the electro-mechanical energy converter is working in the first or second mode, the self-setting of the interactive rotary connection being based solely on movement of components thereof and based on a sense of rotation thereof and free of any manipulation by an actuator, said rpm ratios being defined as quotients of the first rpm rate divided by the second rpm rate; wherein the interactive rotary connection comprises at least one rotary transfer device arranged between the electro-mechanical energy converter and the combustion engine; and wherein the at least one rotary transfer device comprises a planetary gear mechanism with at least one ring gear, at least one sun gear, and at least one planet carrier with at least one planet gear.

* * * * *

UNITED STATES PATENT AND TRADEMARK OFFICE
CERTIFICATE OF CORRECTION

PATENT NO. : 7,114,585 B2 Page 1 of 1
APPLICATION NO. : 10/801384
DATED : October 3, 2006
INVENTOR(S) : Laszlo Man et al.

It is certified that error appears in the above-identified patent and that said Letters Patent is hereby corrected as shown below:

On the title page:

Item [56]

Please delete "Continuation of application No. 10/021,310, filed on Oct. 22, 2001, now abandoned, which is a continuation of application No. 09/564,361, filed on Jun. 22, 2001, now abandoned, which is a contination of application No. PCT/DE99/02833, filed on Sep. 2, 1999." and substitute with -- Division of application No. 10/021,310, filed on Oct. 22, 2001, now abandoned, which is a continuation of application No. 09/564,361, filed on May 2, 2000, now abandoned, which is a contination of application No. PCT/DE99/02833, filed on Sep. 2, 1999 --.

Signed and Sealed this

Twenty-sixth Day of December, 2006

JON W. DUDAS
*Director of the United States Patent and Trademark Office*